United States Patent
Aoki

(10) Patent No.: US 7,395,121 B2
(45) Date of Patent: Jul. 1, 2008

(54) SERVICE PROVIDING SYSTEM

(75) Inventor: Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 84 days.

(21) Appl. No.: 11/341,455

(22) Filed: Jan. 30, 2006

(65) Prior Publication Data

US 2006/0173561 A1 Aug. 3, 2006

(30) Foreign Application Priority Data

Jan. 31, 2005 (JP) ............................. 2005-023953

(51) Int. Cl.
*G06F 1/00* (2006.01)
*G06F 1/24* (2006.01)
*G06F 9/00* (2006.01)
*G05B 15/00* (2006.01)
*G03G 15/20* (2006.01)

(52) U.S. Cl. ............................. 700/1; 399/70; 713/100; 713/300; 713/310; 713/323; 713/324

(58) Field of Classification Search .................. 700/22, 700/1; 399/70; 358/1.13–1.15; 713/323–324, 713/100, 300, 310
See application file for complete search history.

(56) References Cited

U.S. PATENT DOCUMENTS

| | | | | |
|---|---|---|---|---|
| 5,915,148 | A * | 6/1999 | Hamaguchi et al. | 399/77 |
| 6,029,238 | A * | 2/2000 | Furukawa | 712/1 |
| 6,094,546 | A * | 7/2000 | Nakazato et al. | 399/1 |
| 6,822,754 | B1 * | 11/2004 | Shiohara | 358/1.15 |
| 7,209,805 | B2 * | 4/2007 | Motoyama | 700/286 |
| 2002/0054316 | A1 * | 5/2002 | Abe | 358/1.14 |
| 2003/0053112 | A1 * | 3/2003 | Motosugi et al. | 358/1.14 |
| 2006/0126090 | A1 * | 6/2006 | Shen | 358/1.13 |

FOREIGN PATENT DOCUMENTS

JP 62-087378 A 4/1987

* cited by examiner

*Primary Examiner*—Ronald D Hartman, Jr.
(74) *Attorney, Agent, or Firm*—Banner & Witcoff, Ltd.

(57) ABSTRACT

A service providing system includes input/output devices, a service providing device configured to provide services by driving the input/output devices, and a preparation device, in response to receipt of a provision command for a service, configured to selectively place the input/output devices, for providing the service, which are in a non-standby state, into a standby state. In a multi-function device system including input/output devices, a method of providing a service includes receiving a provision command for a service, and selectively placing the input/output devices for providing the service into a standby state in response to the provision command.

12 Claims, 17 Drawing Sheets

FIG.5

(DEVICE TABLE)

| DEVICE ID | DEVICE TAG INFORMATION | PREPARATION TIME |
|---|---|---|
| SCANNER ID | SCANNER | 30 SEC. |
| INKJET PRINTER ID | COLOR PRINTER | 20 SEC. |
| LASER BEAM PRINTER ID | PRINTER<br>MONOCHROME PRINTER | 60 SEC. |

DEVICE INFORMATION

FIG.6

(SERVICE LIST)

| SERVICE ID | SERVICE NAME | DEVICE USE INFORMATION | PREPARATION DETERMINATION AUTHORITY | DATA PROCESSING TIME ESTIMATION METHOD |
|---|---|---|---|---|
| ****1 | ENGLISH-JAPANESE TRANSLATION | "SCANNER", "PRINTER" | MULTI-FUNCTION DEVICE | OUTPUT PAGES × 30 SEC. |
| ****2 | IMAGE REGISTRATION IN LIBRARY | "SCANNER" | MULTI-FUNCTION DEVICE | N/A |
| ****3 | IMAGE OUTPUT FROM LIBRARY | "COLOR PRINTER" | MULTI-FUNCTION DEVICE | 60 SEC. (FIXED) |
| ****4 | NEWS SEARCH & OUTPUT | "SCANNER", "MONOCHROME PRINTER" | SERVER | N/A |
| ... | ... | ... | ... | ... |

INDIVIDUAL SERVICE INFORMATION

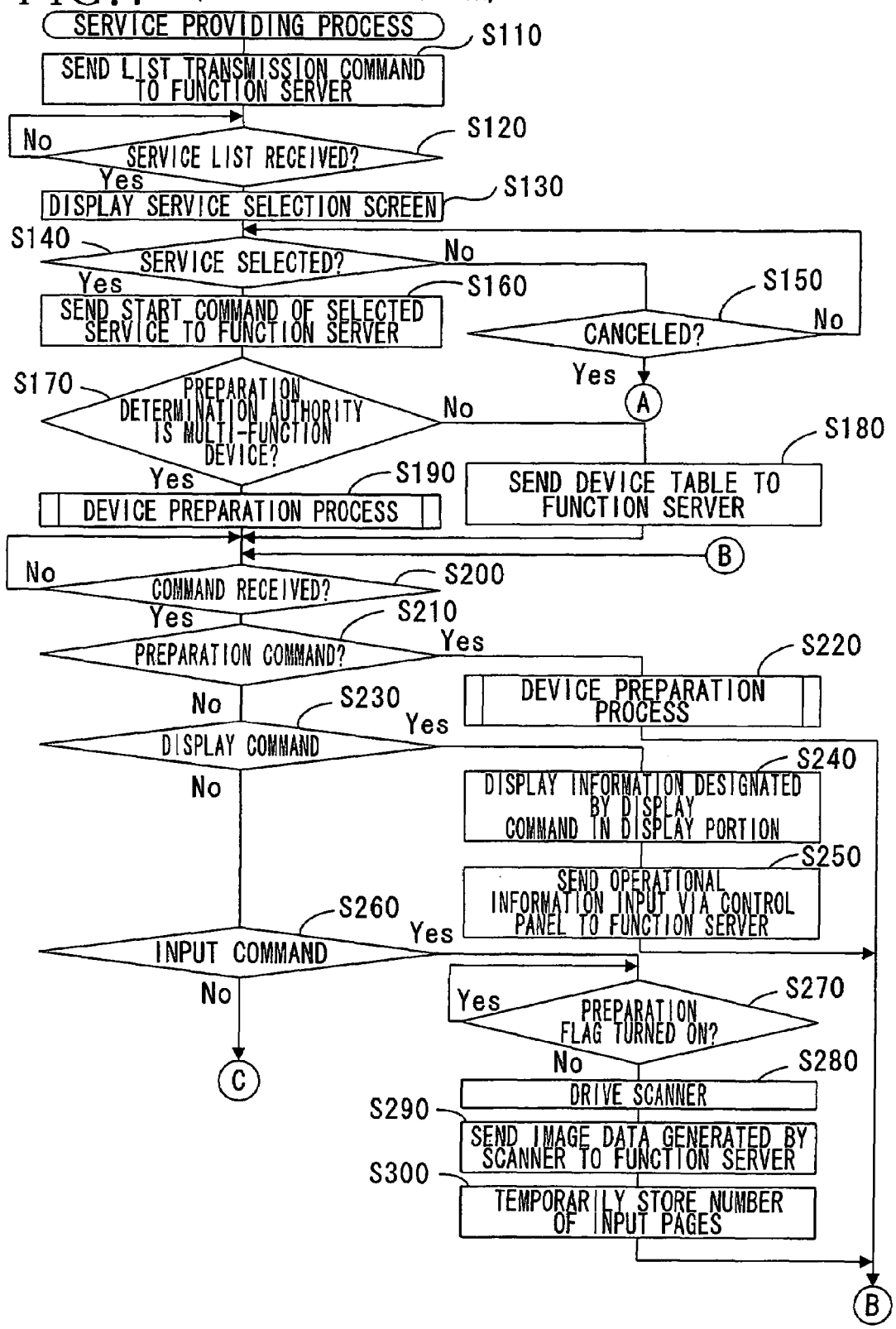
FIG. 7 (MULTI-FUNCTION DEVICE)

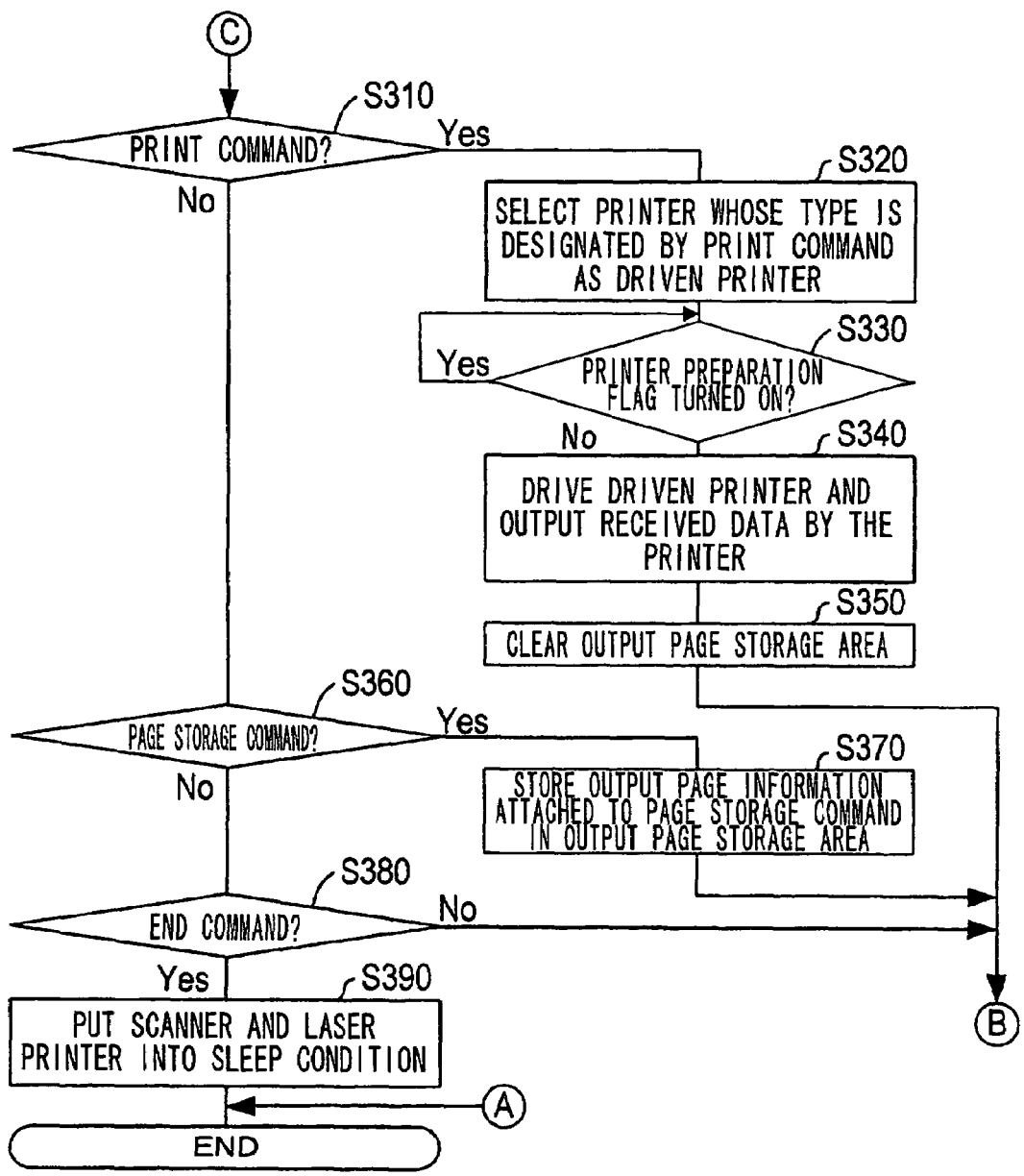

SERVICE PROVIDING SYSTEM

CROSS REFERENCE TO RELATED APPLICATIONS

This application claims priority from Japanese Patent Application No. 2005-023953 filed Jan. 31, 2005, the entire content of which is incorporated herein by reference.

TECHNICAL FIELD

Illustrative aspects of the invention relate to a service providing system that provides various services to users.

BACKGROUND

In conventional service providing systems, a server device and an image processor owned by a user cooperate with each other to provide various services, or a user's image processor alone provides various services to the user.

Known services provided to users may be, for example, content, such as news or weather forecast; translation services in which data input to a server device from the user's image processor is subjected to translation processing and the resulting data is provided to the user via the image processor; and image registration in a library in which data, such as image data, input from the user's image processor to a server device is registered in a library and made available.

The image processor may be, for example, a personal computer or a personal digital assistance (PDA) that output content or processing results to a monitor, and a printer, a facsimile machine, or a copier that can perform print output on network.

A known printer disclosed in Japanese Laid-Open Patent Publication No. 62-87378, warms up when a user performs a predetermined operation to use the printer.

In recent years, a digital multi-function device integrating a multiple devices, such as a printer and a scanner, has been developed. The digital multi-function device has many devices contained therein. When a user has not used a service for a predetermined amount of time, a device within the multi-function device that consumes a substantial amount of power is placed into a sleep mode or so-called power-saving mode.

In the conventional digital multi-function device, when a user performs an operation associated with the use of a service, the devices, such as the printer and the scanner, that have been placed in the sleep condition in which the devices cannot be driven, are all put into a standby state where the devices can be driven. Therefore, even when a user does not desire a service that uses, for example, the scanner, the scanner is placed in the standby state. Thus, power is wasted.

A known scanner is placed in the sleep condition by turning off a lamp for irradiating a read object, such as a document, when the read object is read with an image pickup device. In a digital multi-function device including such a scanner, the lamp is turned on even when the scanner does not need to be driven to provide a service desired by a user. Thus, power is wasted.

A known digital multi-function device includes, as a printer, an inkjet printer and a laser beam printer. In a conventional digital multi-function device, both of the inkjet printer and the laser beam printer are placed in the standby state, regardless of the types of services that a user desires. Thus, sources, such as power or ink, are wasted.

For example, an inkjet printer performs a cleaning operation by ejecting ink in the ink tank from nozzles to clean the nozzles before a print output is performed. Thus, dried or solidified ink adhered to the nozzles of an inkjet print head can be removed. In a digital multi-function device that includes such an inkjet printer, the cleaning operation is performed even when the inkjet printer does not need to be driven to provide a service desired by a user. Thus, ink is wasted.

In a known laser beam printer, a fixer for fixing a toner image onto a sheet is turned off to place the laser beam printer in the sleep condition. In a digital multi-function device including such a laser beam printer, the fixer is turned on even when the laser beam printer does not need to be driven to provide a service desired by a user. Thus, power is wasted.

When the switch is made between the scanner and the printer to provide services by the digital multi-function device, the printer is generally driven after the scanner is driven. Conventionally, all the devices in the multi-function device are placed in the standby state at the substantially same time. Therefore, the time when the fixer is turned on becomes longer, leading to wasted power consumption.

SUMMARY

At least some illustrative aspects of the invention provide a service providing system that provides various services using input/output devices in which sources, such as power and ink, are effectively used.

BRIEF DESCRIPTION OF THE DRAWINGS

Illustrative example structures in accordance with the present invention will be described in detail with reference to the following figures wherein:

FIG. 5 shows a device table stored in a storage portion of the multi-function device according to at least one illustrative aspect of the invention;

FIG. 6 shows a service list stored in a storage portion of the server according to at least one illustrative aspect of the invention;

FIGS. 7 and 8 are flowcharts showing a service providing process performed by a controller of the multi-function device according to at least one illustrative aspect of the invention;

DETAILED DESCRIPTION

General Overview

Figure 1:
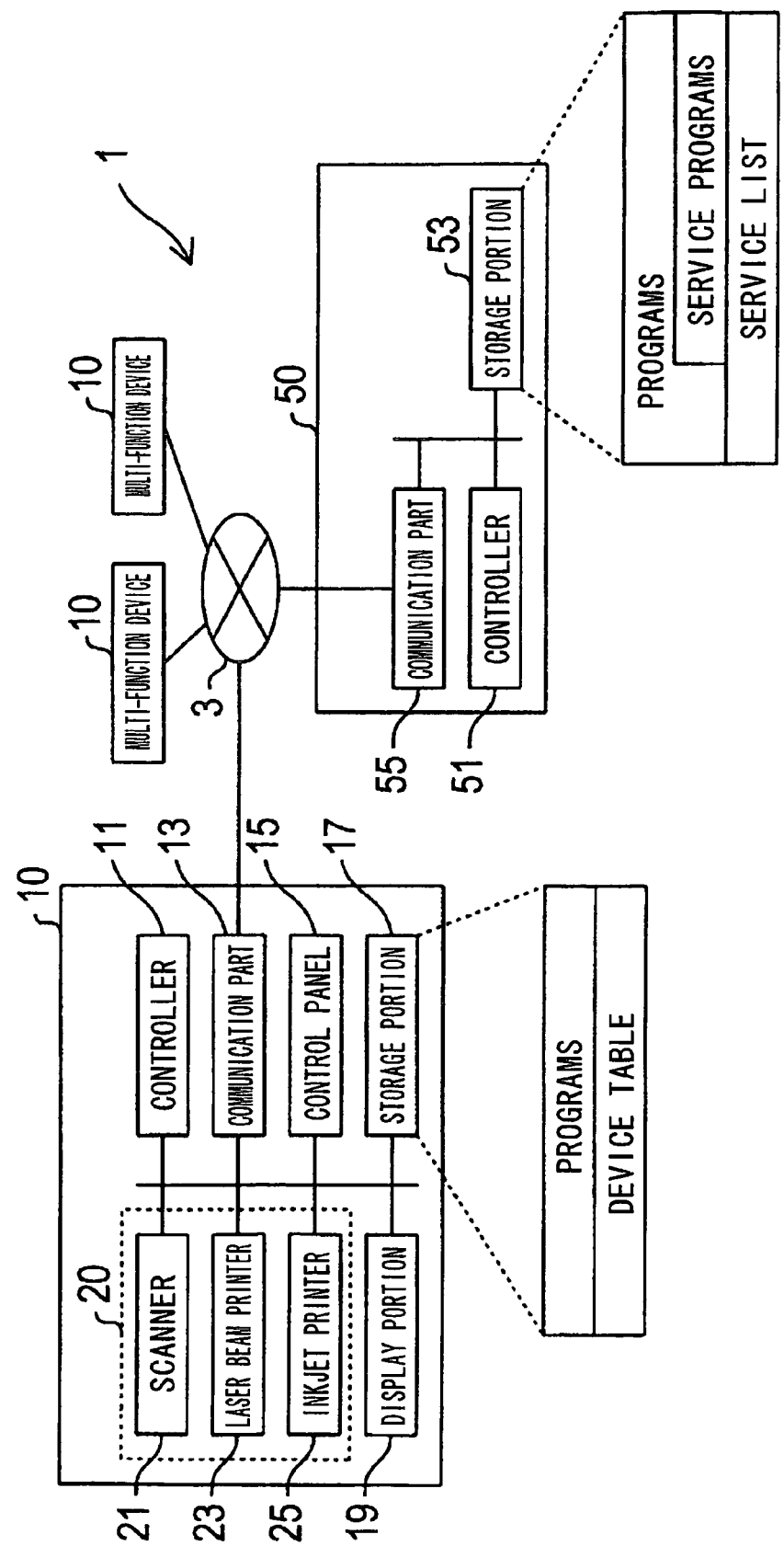
FIG. 1 shows a service providing system including a multi-function device and a server according to an illustrative aspect of the invention.

A service providing system may include input/output devices configured to perform input and output operations, a service providing device configured to provide services by driving the plurality of input/output devices, and a preparation device, in response to receipt of a provision command for a service, configured to selectively place the input/output devices, for providing the service, which are in a non-standby state into a standby state.

More specifically, unlike a conventional service providing system, the service providing system, according to aspects of the invention, may not place all of the input/output devices unconditionally in the standby state when the provision command is input, but may selectively place the input/output devices to be driven by the service providing device in the standby state when a service designated by the provision command is provided.

Accordingly, in aspects of the invention, sources, such as power and ink, may be prevented from being wasted by placing the input/output devices that need not to be driven in the standby state. Therefore, sources may be effectively used when various services are provided.

The service providing system may further include an estimation device configured to estimate a driving time for the service providing device to drive the input/output devices, and a determination device configured to determine an execution time for the preparation device to selectively place the input/output devices into the standby state, based on the driving time. The preparation device may selectively place the input/output devices into the standby state, based on the execution time.

In aspects, the preparation device may start to place the input/output devices into the standby state, based on the execution time determined by the determination device. Therefore, even when the time the input/output devices is driven by the service providing device is long after a provision command has been input, sources, such as power and ink, may be prevented from being wasted by unnecessarily placing the input/output devices in the standby state at the start of the provision command. Thus, the sources may be effectively used.

In aspects, the determination device may determine the execution time of the preparation device for the input/output devices to be selectively placed in the standby state immediately prior to the driving time. With such a structure, the sources may further be effectively used.

The service providing system may further include a time storage device configured to store a time, when the preparation device starts selectively placing the input/output devices into the standby state. The determination device may determine the execution time, based on the driving time and a time stored in the time storage device.

With the adjustment of the time stored in the time storage device, the execution time may be precisely determined such that the input/output devices can be placed in the standby state just before the input/output devices are driven.

The service providing system may further include a drive device information storage device configured to store, according to the services available from the service providing device, information identifying the input/output devices that are driven to provide the services. The preparation device may selectively place the input/output devices into the standby state, based on the information stored in the drive device information storage device.

In aspects, the preparation device may be structured as a general-purpose preparation device. For example, in the service providing system in which functions of the preparation device are realized by a computer using programs, when the available services are changed, the preparation device may be adapted for a new service providing system incorporating the changes, with changes of the storage content in the drive device information storage device, without having to modify the programs greatly.

As the input/output devices of the service providing system, an input device such as a scanner for use in a digital multi-function device, and an output device, such as a laser beam printer and an inkjet printer, may be employed.

One of the input/output devices may be a printer including a fixer. The printer may form a toner image on a recording medium and thermally fix the toner image on the recording medium using the fixer. When the printer is in the non-standby state with the fixer turned off, the preparation device may place the printer into the standby state by turning the fixer on.

In a printer that thermally fixes the toner image, heat may be generated by a fixer. Therefore, when the fixer is turned on, power consumption may become great. In aspects of the invention, when the printer is not a device that needs to be driven for the provision of a service designated by a provision command, the fixer may be left off in which heat is not generated. Thus, the service may be provided while saving power.

One of the the input/output devices may be a scanner including a lamp. The scanner may irradiate a read object with the lamp to read information on the read object based on reflected light. When the scanner is in the non-standby state with the lamp turned off, the preparation device may place the scanner in the standby state by turning the lamp on.

In a scanner that irradiates a read object with a lamp thereof to read information on the read object, power may be greatly consumed when the lamp gives off light. In aspects of the invention, when the scanner is not a device that needs to be driven for the provision of a service designated by a provision command, the lamp may be left off in which the lamp does not give off light. Thus, the service may be provided while saving power.

One of the input/output devices may be an inkjet printer configured to eject ink from nozzles to form an image on a recording medium. When the inkjet printer is in the non-standby state where the nozzles are not cleaned, the preparation device may place the inkjet printer into the standby state by cleaning the nozzles.

In an inkjet printer that cleans nozzles thereof by ejecting ink from the nozzles, when cleaning is unnecessarily performed, ink is consumed quickly, resulting in increases in running costs. In aspects of the invention, when the inkjet printer is not a device that needs to be driven for the provision of a service designated by a provision command, cleaning may not be performed, so that increases in running costs may be prevented.

The service providing system may further include a digital multi-function device, connected to a network, includes an operation device that is configured to be operated by a user, the input/output devices, the service providing device, and the preparation device. A control device may be configured to communicate with the digital multi-function device, via the network, and control the services. When the provision command for the service is received through the operation device, the service providing device may establish communication with the control device and may drive the input/output devices to be driven to provide the service in response to a drive command from the control device.

In a service providing system, a digital multi-function device may provide various services using input/output devices thereof. A control device connected to the digital multi-function device via a network may control the provision of the services by the digital multi-function device, by inputting an instruction for driving the input/output devices to the digital multi-function device. In such a service providing system, a long time may pass until the input/output device is driven after a provision command is input via the operation device of the digital multi-function device by a user's operation of the operation device, as compared with a case in which a service providing system does not perform communication via a network.

Accordingly, in a service providing system in which the digital multi-function device drives an input/output device upon receipt of a drive instruction from the control device, if all input/output devices are placed in the standby state immediately after a provision command is input, power consumption may become greater. However, in aspects of the invention, the input/output devices to be driven for the provision of a service designated by a provision command may be selectively placed into the standby state. In addition, the time when the input/output devices are placed into the standby state may be determined based on the driving time. Therefore, various services may be provided by the service providing system according to the aspects of the invention while saving more power than a conventional service providing system.

An illustrative method of providing a service in a multi-function device system including input/output devices includes receiving a provision command for a service, and selectively placing the input/output devices for providing the service into a standby state in response to the provision command.

Illustrative Aspects

Illustrative aspects will be described with reference to the accompanying drawings. A service providing system 1 according to an illustrative aspect includes digital multi-function devices 10 (hereinafter simply referred to as "multi-function devices") connected to a network 3, such as the Internet, and a function server 50 connected to the network 3.

Each multi-function device 10 includes a controller 11 provided with a known CPU, ROM, and RAM, a communication part 13 that can communicate with the function server 50 via the network 3, a control panel 15 that can be operated by a user, a storage portion 17 that stores various programs and data, a display portion 19 that displays various information, and a group 20 of input/output (I/O) devices that can input or output.

The controller 11 controls various parts of the multi-function device 10 by executing various programs with the CPU. The control panel 15 is provided with keys (not shown) including left, right, up, and down cursor keys that are operable by a user. The controller 11 obtains and inputs thereto information about a user's operation, via the keys.

The storage portion 17 is a rewritable nonvolatile storage device, such as NVRAM (nonvolatile RAM) and a hard disk. The storage portion 17 stores programs to be executed by the controller 11 and a device table (shown in FIG. 5), which will be described below. The display portion 19 is, for example, a liquid crystal display and provides information to a user via the display.

The multi-function device 10 includes a scanner 21, a laser beam printer 23 and an inkjet printer 25, as I/O devices.

Figure 2A:
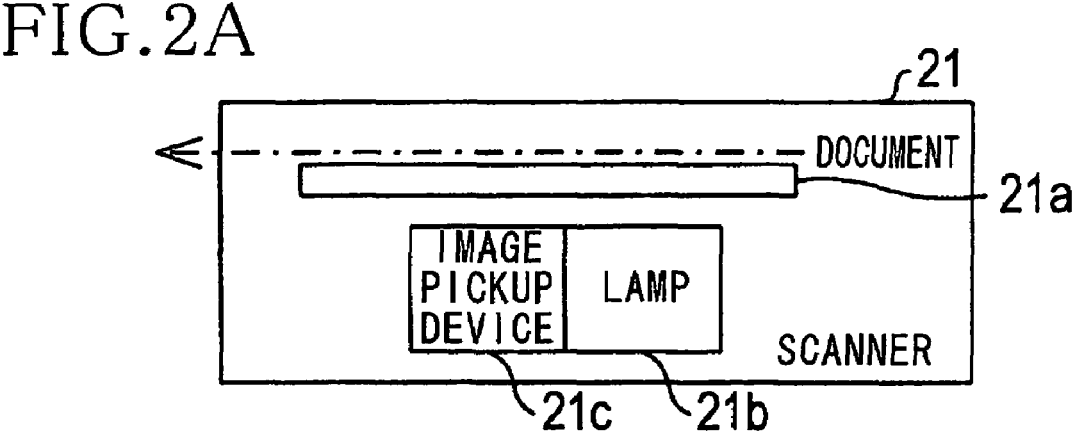
FIG. 2A-2C show a general structure of a scanner and its condition transition according to at least one illustrative aspect of the invention.
Figure 2B:
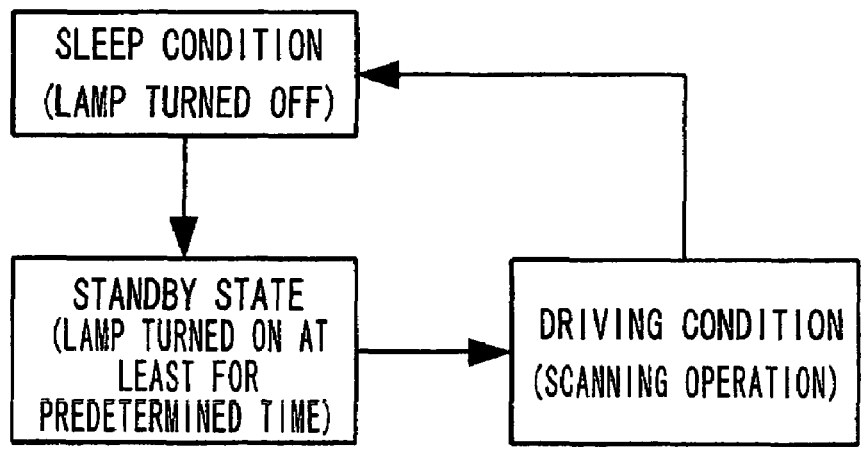
Figure 2C:
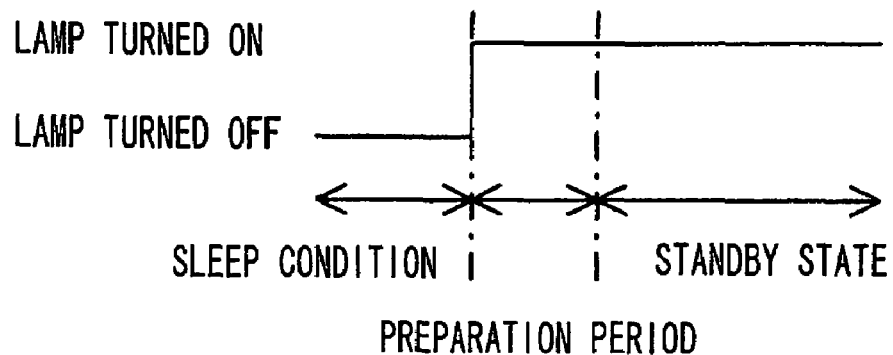

The scanner 21 will be described with reference to FIGS. 2A-2C. As shown in FIG. 2A, the scanner 21 includes a platen glass 21a, a lamp 21b, and an image pickup device 21c. The lamp 21b emits light to a read object (document) set on the platen glass 21a. Based on the reflected light, information that the read object has is converted into image data by the image pickup device 21c. Thus, an image on the read object is read.

The scanner 21 is structured such that the lamp 21b can be turned on or off. As shown in FIG. 2B showing transition of the conditions of the scanner 21, the lamp 21b is switchable between three conditions under the control of the controller 11: a sleep condition where the lamp 21b is turned off and does not emit light; a standby state where the lamp 21b is turned on and stably emits light; and a drive condition where the lamp 21b and the image pickup device 21c are moved in scanning direction to perform an image reading operation. FIG. 2C shows relation between ON/OFF conditions of the lamp 21b and conditions of the scanner 21 with reference to the time.

In the sleep condition where the lamp 21b is turned off, the scanner 21 is not ready for the image reading operation. Therefore, the controller 11 controls the scanner 21 to turn on the lamp 21b before the image reading operation is started, to put the scanner 21 into the standby state where an image on a document is readable. For the scanner 21 to properly perform the image reading operation, the lamp 21b has to stably emit light. Time is required until the lamp 21b stably emits light, after the lamp 21b is turned on, to place the scanner 21 into the standby state where an image on a document is readable. The time required to place the scanner 21 in the standby state where the lamp 21b stably emits light after the lamp 21b is switched from OFF to ON and the scanner 21 becomes out of the sleep condition, is referred to as the "preparation time" or "preparation period" of the scanner 21.

Figure 3A:
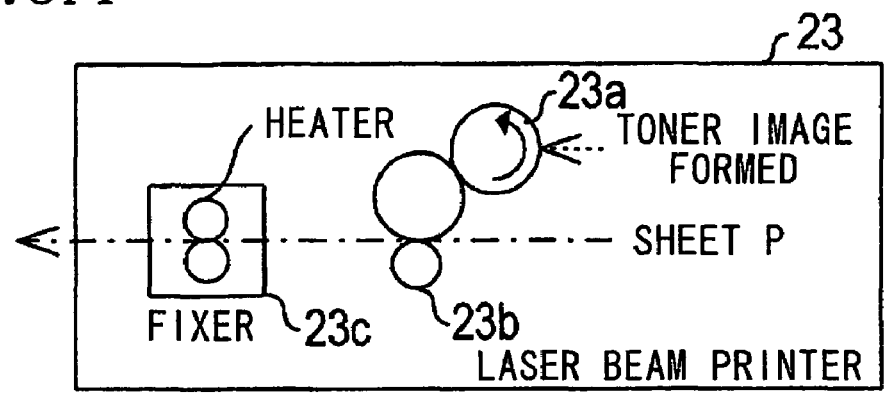
FIG. 3A-3C show a general structure of a laser beam printer and its condition transition according to at least one illustrative aspect of the invention.
Figure 3B:
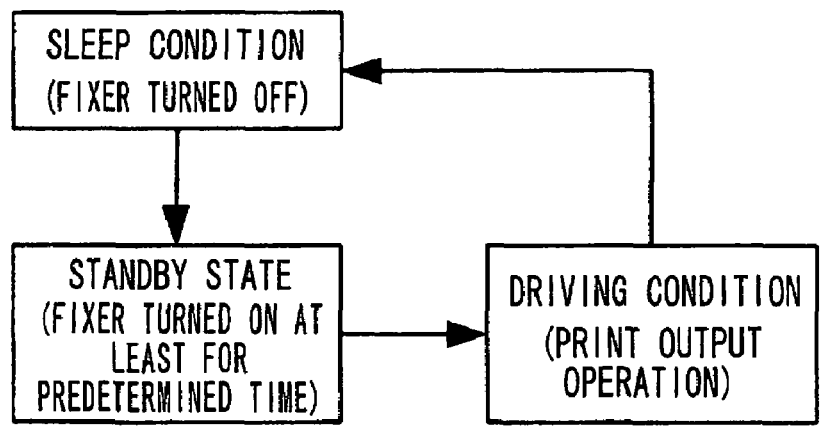
Figure 3C:
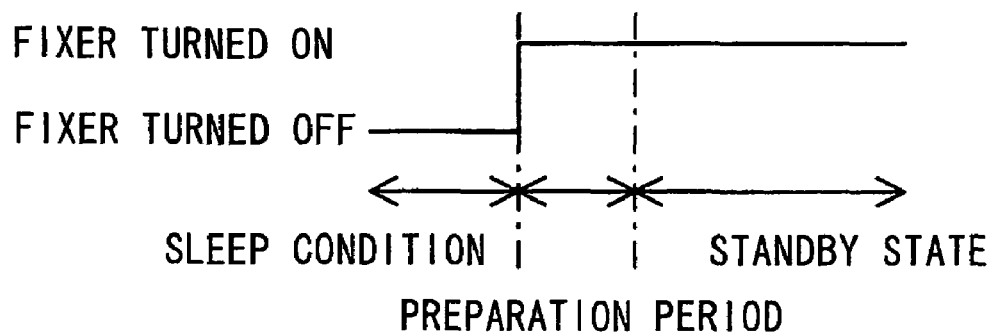

The laser beam printer 23 will be described with reference to FIGS. 3A-3C. As shown in FIG. 3A, the laser beam printer 23, which is one of the I/O devices of the multi-function device 10, includes a photoconductive member 23a to which a laser beam is emitted to form an electrostatic latent image thereon. Toner is applied to the electrostatic latent image to form a toner image on the photoconductive member 23a. The toner image is transferred on a sheet P while the sheet P passes over a transfer member 23b and is thermally fixed onto the sheet P by a fixer 23c including a heater for generating heat.

The laser beam printer 23 is structured such that the fixer 23c can be turned on or off. As shown in FIG. 3B showing transition of the conditions of the laser beam printer 23, the fixer 23c is switchable between three conditions under the control of the controller 11: a sleep condition where the fixer 23c is turned off and does not generate heat; a standby state where the fixer 23c is turned on and generates enough heat to fix the toner image on the sheet P; and a drive condition where a print output operation is performed by fixing the toner image on the sheet P. FIG. 3C shows relation between the ON/OFF conditions of the fixer 23c and conditions of the laser beam printer 23 with reference to time.

In the sleep condition where the fixer 23c is turned off, the laser beam printer 23 is not ready for the print output operation. Therefore, the controller 11 controls the laser beam printer 23 to turn on the fixer 23c before the print output operation is started, to put the laser beam printer 23 into the standby state where the print output operation can be performed. For the laser beam printer 23 to properly perform the print output operation, the fixer 23c has to generate enough heat to fix the toner image on the sheet P. Time is required until the fixer 23c generates enough heat to fix the toner image on the sheet P, after the fixer 23c is turned on, to place the laser beam printer 23 into the standby state where the print output operation can be performed. The time required to place the laser beam printer 23 in the standby state where the fixer 23c generates enough heat after the fixer 23c is switched from OFF to ON and the laser beam printer 23 becomes out of the sleep condition, is referred to as the "preparation time" or "preparation period" of the laser beam printer 23.

Figure 4A:
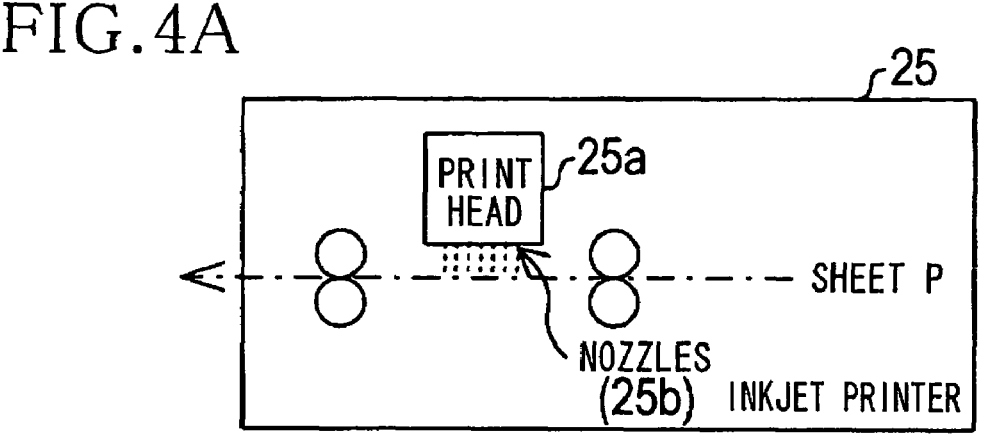
FIG. 4A-4C show a general structure of an inkjet printer and its condition transition according to at least one illustrative aspect of the invention.
Figure 4B:
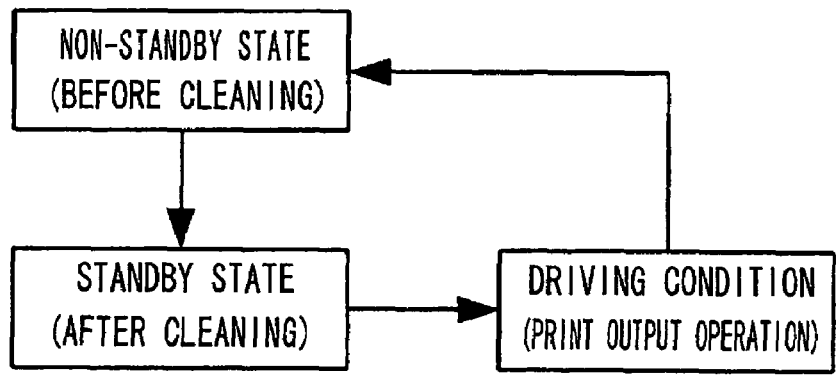
Figure 4C:
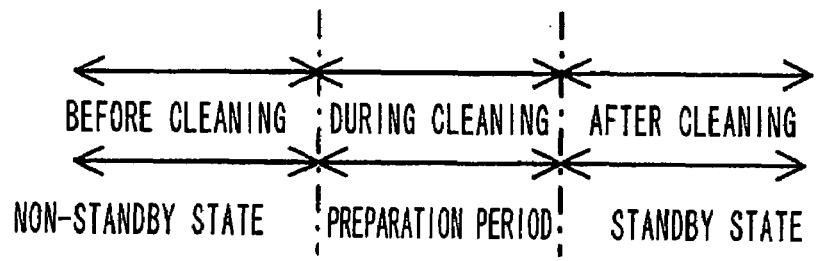

The inkjet printer 25 will be described with reference to FIGS. 4A-4C. As shown in FIG. 4A, the inkjet printer 25 includes an inkjet print head 25a provided with nozzles 25b from which ink is ejected to form an image on a sheet P fed along a sheet feed path.

The inkjet printer 25 is structured to perform cleaning to remove dried or solidified ink adhered to the nozzles 25b upon instruction from the controller 11. Cleaning is performed by ejecting a very small amount of ink from the nozzles 25b toward an ink receiver (not shown). As shown in FIG. 4B showing transition of the conditions of the inkjet printer 25, the conditions of the inkjet printer 25 is classified into three conditions: a non-standby state where cleaning is not performed and solidified ink is adhered to the nozzles 25b; a standby state where cleaning is complete and ink can be properly ejected from the nozzles 25b; and a drive condition where a print output operation is performed by ejecting ink from the nozzles 25b onto the sheet P. FIG. 4C shows relation between cleaning and conditions of the inkjet printer 25 with reference to the time.

In the non-standby state before cleaning is performed, the inkjet printer 25 is not ready for the print output operation. Therefore, the controller 11 controls the inkjet printer 25 to perform cleaning, before the print output operation is started, to put the inkjet printer 25 into the standby state where the print output operation can be performed. It takes a certain time for cleaning. The time when the cleaning is being performed is a transitional period between the non-standby state and the standby state. The time required for cleaning is referred to as "preparation time" or "preparation period" of the inkjet printer 25.

The preparation time of each of the scanner 21, the laser beam printer 23, and the inkjet printer 25 is stored in the device table (in FIG. 5) stored in the storage portion 17 of the multi-function device 10. As will be described below, the controller 11 determines, based on the device table, the switching time when the fixer 23a of the laser beam printer 23 is turned on or off, and the time when cleaning is performed in the ink jet printer 25.

FIG. 5 shows a structure of the device table stored in the storage portion 17. The device table has device information, according to the I/O devices of the scanner 21, the laser beam printer 23, and the inkjet printer 25. The device information includes a device ID, device tag information representing the type of the I/O device, and preparation time information representing the preparation time of the I/O device. The device tag information is used when the controller 11 drives an I/O device designated by the function server 50.

The function server 50 will be described in detail below. As shown in FIG. 1, the function server 50 is provided with a controller 51 including a CPU, ROM, and RAM, a storage portion 53, and a communication part 55 that can communicate with the multi-function device 10 via the network 3.

The controller 51 controls various parts of the function server 50 by executing various programs with the CPU. For example, when a service start command is received from the multi-function device 10 via the network 3, the controller 51 executes, in accordance with the service start command, a program (service program) for providing a service designated by the multi-function device 10 to the multi-function device 10.

The storage portion 53 has a hard disk in which programs for providing various services (service programs), contents, and a service list (in FIG. 6) are stored. The service list lists services available from the function server 50.

As shown in FIG. 6, the service list stored in the storage portion 53 has individual service information including a service ID, which is service identification information, a service name, device use information, a preparation determination authority, and a data processing time estimation method, according to the services available from the function server 50. The device use information represents a type of an I/O device that is driven by an instruction from the function server 50 to the multi-function device 10 when a service is provided. The preparation determination authority represents which of the multi-function device 10 or the function server 50 has an authority to determine the execution time of the process required to place an I/O device to be driven (driven I/O device) in the standby state from the non-standby state (sleep condition). The data processing time estimation method represents an estimation method (arithmetic expression) for estimating at the multi-function device 10 the time (data processing time) since the function server 50 received the service start command to complete the data processing for providing a service. The service list is read out from the storage portion 53 as the function server 50 receives a list transmission command from the multi-function device 10. The service list is sent from the function server 50 to the multi-function device 10 that has transmitted the list transmission command (refer to FIG. 14).

Processing performed by the controller 11 of the multi-function device 10 will be described below with reference to FIGS. 7 to 13 and the processes performed by the controller 51 of the function server 50 will be described below with reference to FIGS. 14 to 17.

FIGS. 7 and 8 are flowcharts showing a service providing process performed by the controller 11 when an instruction to shift to a service mode is entered from the control panel 15 by a user's operation. When the service providing process is executed, the controller 11 sends to the function server 50 via the network 3 the list transmission command to obtain the service list, as shown in FIG. 6, from the function server 50 in S110. The controller 11 waits until the service list is received from the function server 50, in response to the list transmission command (S120). When the service list is received (S120: YES), the service selection screen (not shown) listing the service names of the services registered in the received service list is displayed in the display portion 19 (S130).

As the display in S130 is finished, the controller 11 determines whether one of the services displayed in the service selection screen is selected by a user via the control panel 15 (S140). When the controller 11 determines that no service is selected (S140: NO), flow proceeds to S150 where the controller 11 determines whether a cancel instruction is input from the control panel 15 by a user's operation. When it is determined that cancel is input (S150: YES), the service providing process ends. When it is determined that cancel is not input (S150: NO), flow proceeds to S140 and the controller 11 waits until one of the services displayed in the service selection screen is selected or the cancel instruction is input.

Figure 9:
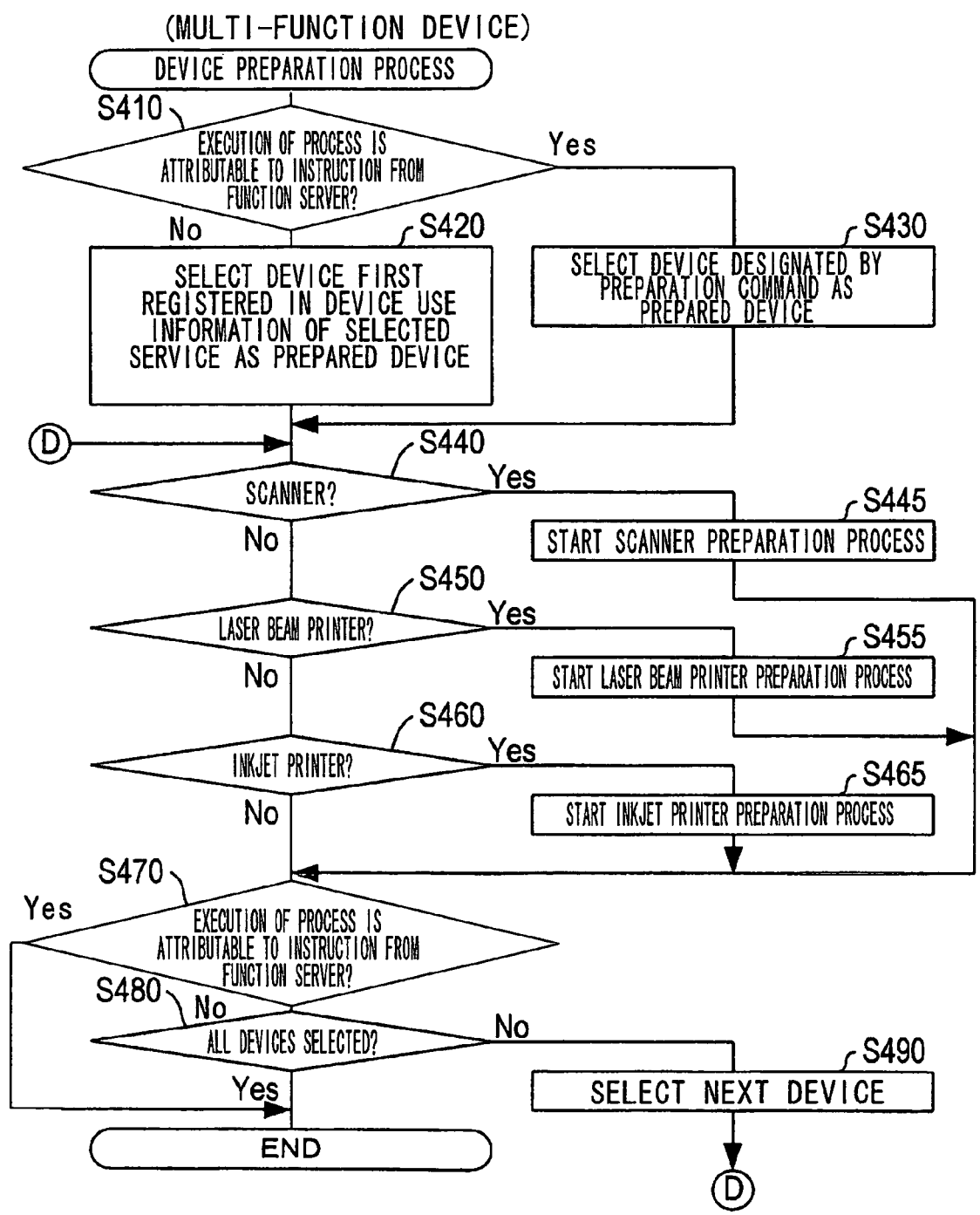
FIG. 9 is a flowchart showing a device preparation process performed by the controller of the multi-function device according to at least one illustrative aspect of the invention.

When it is determined that one of the services is selected (S140: YES), flow proceeds to S160 where a service start command is transmitted to the function server 50, via the network 3 for instructing the function server 50 to execute a program corresponding to the selected service. As the transmission in S160 is finished, the controller 11 determines whether the preparation determination authority of the selected service is the "multi-function device" (S170). When it is determined that the preparation determination authority is not the multi-function device 10 but the server 50 (S170: NO), the device table is read from the storage portion 17 and is sent to the function server 50 (S180). Thereafter, flow proceeds to S200. When it is determined that the preparation determination authority is the "multi-function device" (S170: YES), a device preparation process, as shown in FIG. 9, is performed in S190. Then, flow proceeds to S200.

In S200, the controller 11 waits until a command from the function server 50 has been received. As a command is received (S200: YES), the controller 11 determines whether the received command is a preparation command for executing the device preparation process (S210). When it is determined that the received command is the preparation command (S210: YES), the device preparation process shown in FIG. 9 is executed (S220). As the device preparation process in S220 is finished, flow proceeds to S200 where the controller 11 waits until it receives a next command.

When it is determined that the received command is not the preparation command (S210: NO), flow proceeds to S230. The preparation command is only transmitted from the function server 50 when a user selects a service on the service selection screen whose preparation determination authority is the "server".

In S230, the controller 11 determines whether the received command is a display command for displaying information designated by the command in the display portion 19. When it is determined that the received command is the display command (S230: YES), the information designated by the display command is displayed in the display portion 19 (S240). Then, in response to the display of the information designated by the display command in the display portion 19, the controller 11 transmits operational information input by a user via the control panel 15, to the function server 50 (S250). The operational information may be such information to instruct the function server 50 to proceed to the next process. When the transmission in S250 is finished, flow proceeds to S200 where the controller 11 waits until it receives a next command.

When it is determined that the received command is not the display command (S230: NO), flow proceeds to S260 where the controller 11 determines whether the received command is an input command for executing the image reading operation by driving the scanner 21. When it is determined that the received command is the input command (S260: YES), the controller 11 determines whether a scanner preparation flag stored in the RAM is turned on (S270). The scanner preparation flag is turned on during the execution of a scanner preparation process (in FIG. 10) for placing the scanner 21 in the standby state from the sleep condition, and turned off when the scanner preparation process is not performed.

When it is determined that the scanner preparation flag is turned on (S270: YES), the controller 11 waits until the scanner preparation flag is turned off. When it is determined that the scanner preparation flag is turned off (S270: NO), the controller 11 drives the scanner 21 to perform the image reading operation (S280). The image data generated by the image reading operation performed by the scanner 21 is transmitted to the function server 50 (S290). At this time, the controller 11 temporarily stores the number of pages of the image data generated with the scanner 21 (hereinafter referred to as the "the number of input pages") in the RAM (S300). Thereafter, the controller 11 proceeds to S200 where the controller 11 waits until it receives a next command.

When it is determined that the received command is not the input command (S260: NO), flow proceeds to S310 in FIG. 8 where the controller 11 determines whether the received command is a print command. When it is determined that the received command is not the print command (S310: NO), flow proceeds to S360. When it is determined that the received command is the print command (S310: YES), flow proceeds to S320.

In S320, the controller 11 selects a printer whose type is designated by the received print command, as a driven device. More specifically, when the received print command designates the "printer" or "monochrome printer" as the driven device, the laser beam printer 23 is selected as the driven device because the device tag information specifying "printer" or "monochrome printer" in the device table is the laser beam printer 23. When the print command designates a "color printer", the inkjet printer 25 is selected as the driven device because the device tag information specifying "color printer" in the device table is the inkjet printer 25.

As the process in S320 is finished, the controller 11 determines whether a laser beam printer preparation flag stored in the RAM is turned on when the laser beam printer 23 is selected as the driven device or an inkjet printer preparation flag stored in the RAM is turned on when the inkjet printer 25 is selected as the driven device (S330).

Figure 11:
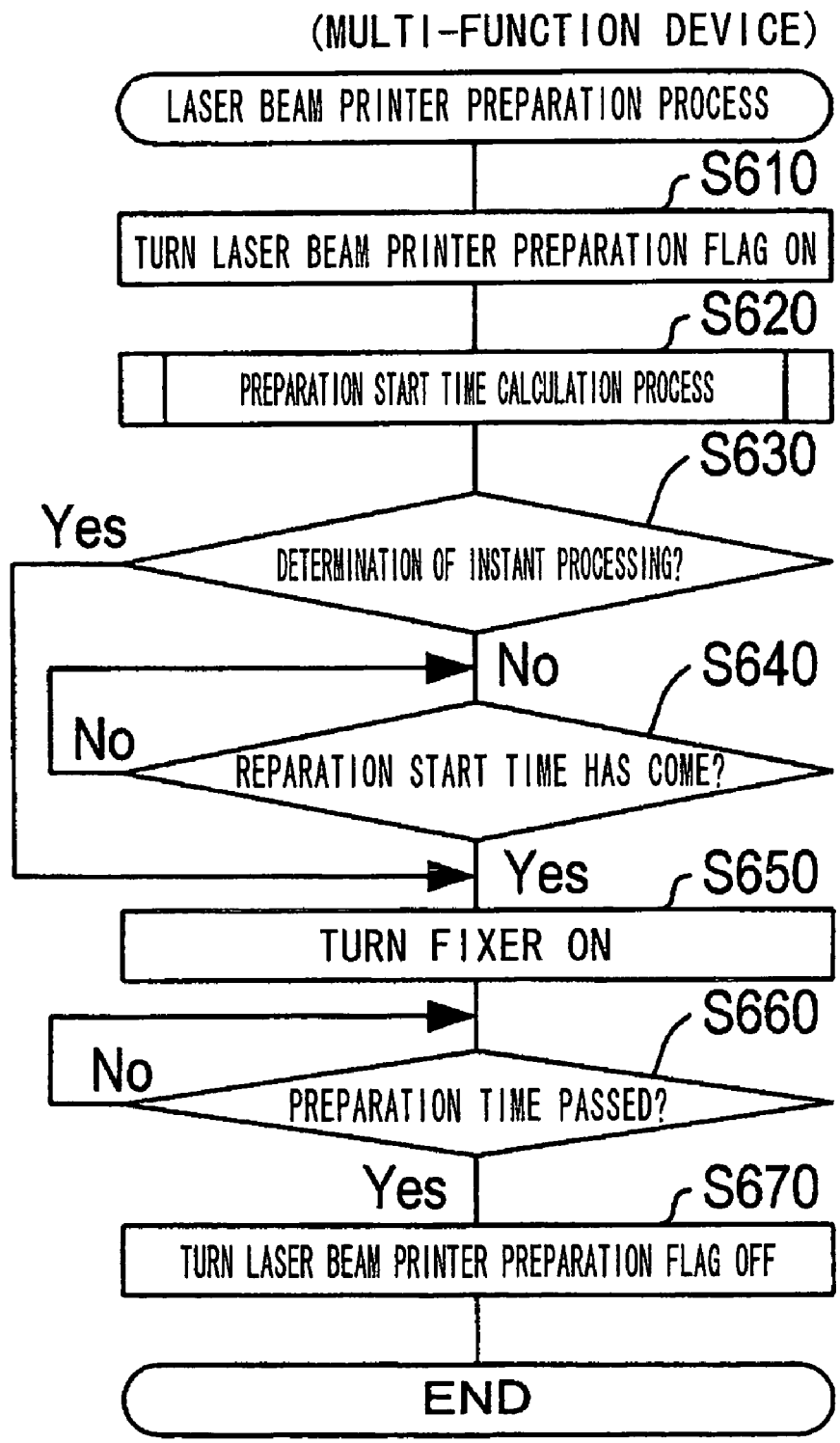
FIG. 11 is a flowchart showing a laser beam printer preparation process performed by the controller of the multi-function device according to at least one illustrative aspect of the invention.
Figure 13:
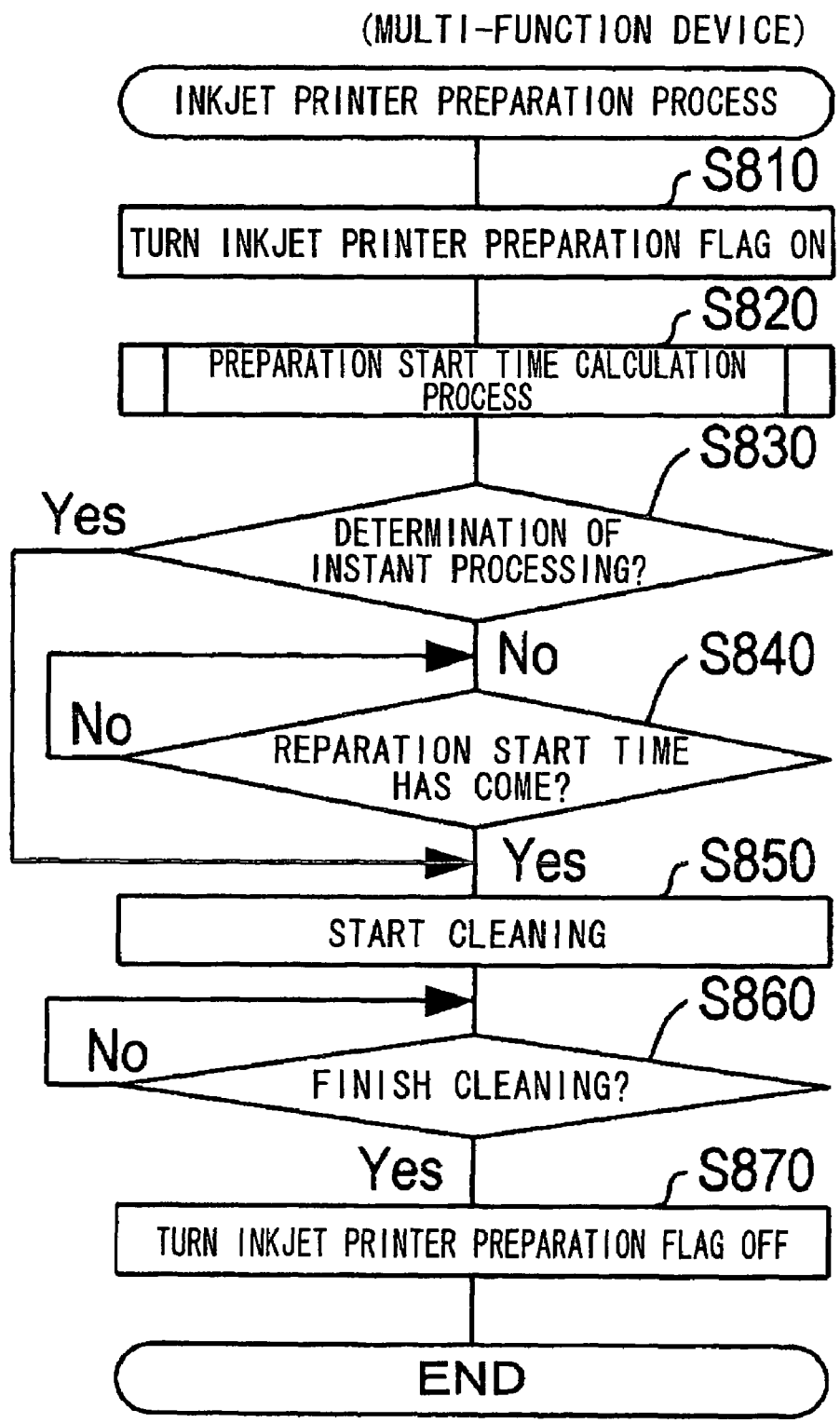
FIG. 13 is a flowchart showing an inkjet printer preparation process performed by the controller of the multi-function device according to at least one illustrative aspect of the invention.

The laser beam printer preparation flag is turned on during the execution of a laser beam printer preparation process, as shown in FIG. 11, for placing the laser beam printer 23 into the standby state from the sleep condition. When the laser beam printer preparation process is not performed, the laser beam printer preparation flag is turned off. Similarly, the inkjet printer preparation flag is turned on during the execution of an inkjet printer preparation process, as shown in FIG. 13, for placing the inkjet printer 25 into the standby state from the non-standby state. When the inkjet printer preparation process is not performed, the inkjet printer preparation flag is turned off.

When it is determined that the preparation flag of the driven device is on (S330: YES), the controller 11 waits until the preparation flag of the driven device is turned off. When it is determined that the preparation flag of the driven device is turned off (S330: NO), the printer selected as the driven device is driven to perform the print output operation (S340). Thus, an image based on print data attached to the received print command is printed and output by the driven device.

When the process in S340 is finished, flow proceeds to S350 where the controller 11 clears an output page storage area of the RAM in which the number of pages of the print data (output page information) informed by the function server 50 before the print command is received is stored. Thereafter, flow proceeds to S200 where the controller 11 waits until it receives a next command.

When it is determined that the received command is not the print command (S310: NO), flow proceeds to S360 where the controller 11 determines whether the received command is a page storage command. When it is determined that the received command is the page storage command (S360: YES), the controller 11 writes the output page information, which is attached to the page storage command and represents the number of pages of the print data to be transmitted by the function server 50, in the output page storage area of the RAM (S370). Then, flow proceeds to S200 where the controller 11 waits until it receives a next command.

When it is determined that the received command is not the page storage command (S360: NO), flow proceeds to S380 where it is determined whether the received command is an end command. When it is determined that the received command is not the end command (S380: NO), the controller 11 handles the received command as an unidentified command and flow proceeds to S200. When it is determined that the received command is the end command (S380: YES), flow proceeds to S390 where the scanner 21 and the laser beam printer 23 is placed in the sleep condition. Then, the service providing process ends.

The device preparation process performed by the controller 11 in S190 and S220 will be described in detail with reference to FIG. 9.

As the device preparation process is started, the controller 11 determines in S410 whether the execution of the device preparation process is attributable to the reception of the preparation command transmitted from the function server 50. When it is determined that the execution of the device preparation process is not attributable to the reception of the preparation command (S410: NO), flow proceeds to S420. When it is determined that the execution of the device preparation process is attributable to the reception of the preparation command (S410: YES), flow proceeds to S430. More specifically, when the device preparation process is started in S190, it is determined as "NO" in S410. When the device preparation process is started in S220, it is determined as "YES" in S410.

In S420, from the service list received from the function server 50, the controller 11 reads out the device use information of the service selected by a user on the service selection screen displayed in the display portion 19 in S130. A device first registered in the device use information is selected as a prepared device. Then, flow proceeds to S440.

Devices that need to be driven to provide the selected service are registered in the device use information by device types (scanner, printer, color printer, and monochrome printer). The controller 11 determines, with the device table stored in the storage portion 17, a device having device tag information corresponding to a device type registered first in the device use information and selects the device as a prepared device.

More specifically, the device type of "scanner" is first registered in the device use information of the service of "English-Japanese translation", "image registration in library", and "news search & output", as shown in FIG. 6. For example, when a service is selected by a user, the scanner 21 that has the device tag information of "scanner" is selected as the prepared device. When a user selects, for example, "image output from library", as shown in FIG. 6, the inkjet printer 25 is selected as the prepared device because the device type of "color printer", which is first registered in the device use information of the service of "image output from library", corresponds to the device tag information of the inkjet printer.

When flow proceeds to S430, the controller 11 selects, as the prepared device, a device designated by the preparation command, to which execution of the device preparation process is attributable. Then, flow proceeds to S440. The function server 50 that transmits the preparation command designates the prepared device with the device type. Accordingly, the controller 11 determines, with the device table, a device having the device tag information corresponding to the device type designated by the preparation command and selects the device as the prepared device. Then, flow proceeds to S440.

Figure 10:
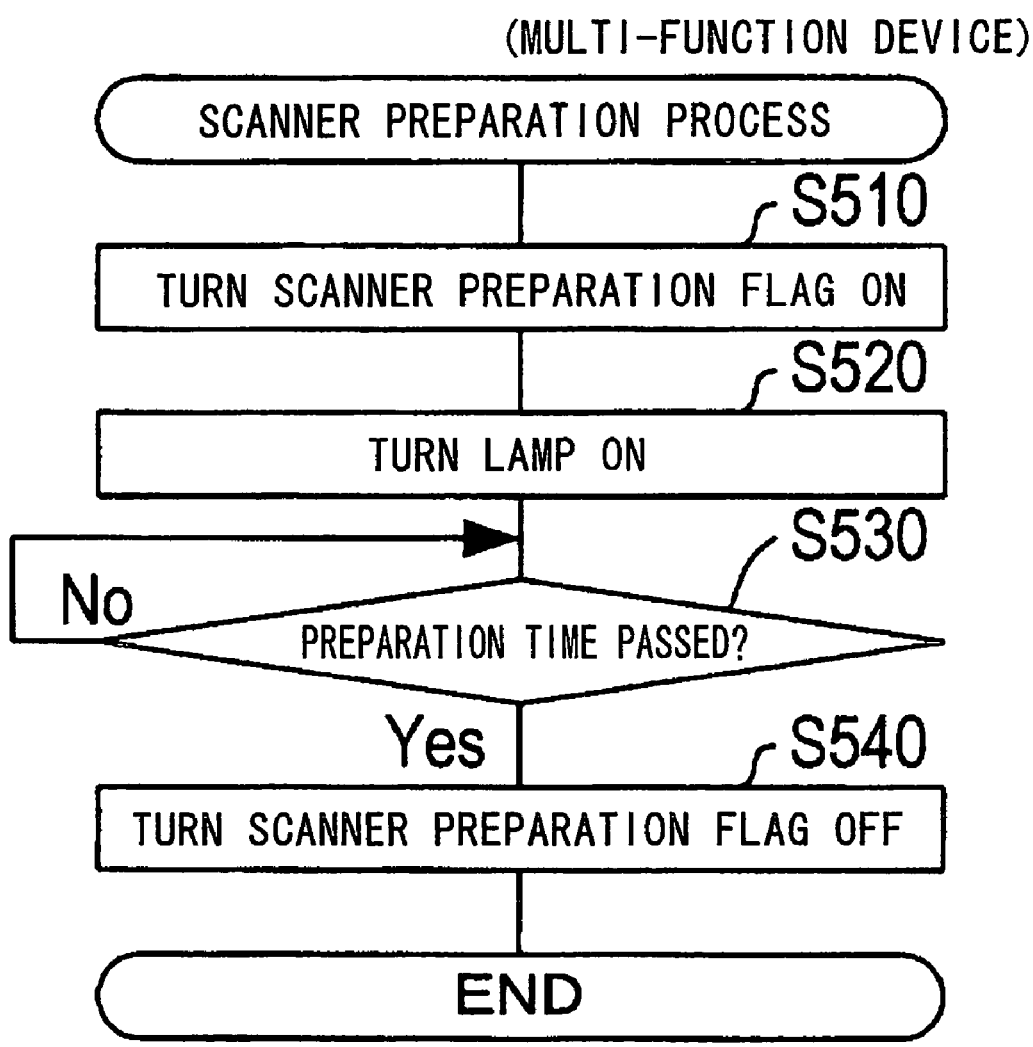
FIG. 10 is a flowchart showing a scanner preparation process performed by the controller of the multi-function device according to at least one illustrative aspect of the invention.

In S440, the controller 11 determines whether the prepared device is the scanner 21. When it is determined that the prepared device is the scanner 21 (S440: YES), flow proceeds to S445 where a scanner preparation process, as shown in FIG. 10, is started. Then, flow proceeds to S470.

When it is determined that the prepared device is not the scanner 21 (S440: NO), the controller 11 determines whether the prepared device is the laser beam printer 23 in S450. When it is determined that the prepared device is the laser beam printer 23 (S450: YES), flow proceeds to S455 where a laser beam printer preparation process, as shown in FIG. 11, is started. Then, flow proceeds to S470.

When it is determined that the prepared device is not the laser beam printer 23 (S450: NO), the controller 11 determines whether the prepared device is the inkjet printer 25 in S460. When it is determined that the prepared device is the inkjet printer 23 (S460: YES), flow proceeds to S465 where an inkjet printer preparation process, as shown in FIG. 13, is started. Then, flow proceeds to S470. When it is determined that the prepared device is not the inkjet printer 25 (S460: NO), flow proceeds to S470 without performing the inkjet printer preparation process in S465.

In S470, the controller 11 makes a determination similar to S410. That is, when it is determined as "YES" in S410, it is also determined as "YES" in S470 and the device preparation process ends. When it is determined as "NO" in S410, it is also determined as "NO" in S470 and flow proceeds to S480.

In S480, the controller 11 determines whether all the devices registered in the device use information of the service designated on the service selection screen are selected as the prepared devices and the processes S440-S470 are performed for all the devices. When it is determined that the processes S440-S470 are not performed for all the devices (S480: NO), flow proceeds to S490 where the device registered next in the device use information is selected as the prepared device and flow proceeds to S440. When it is determined that the processes S440-S470 are performed for all the devices (S480: YES), the device preparation process ends.

The scanner preparation process performed by the controller 11 in S445 will be described with reference to FIG. 10. When the scanner preparation process is started, the controller 11 turns on the scanner preparation flag, which has been turned off and is stored in the RAM (S510). Then, the lamp 21*b* of the scanner 21, which has been turned off, is turned on to make the lamp 21*b* emit light (S520). The controller 11 waits for a preparation time of the scanner 21 specified in the device table to pass since the lamp 21*b* was turned on (S530). When the preparation time has passed, the scanner preparation flag, which has been turned on, is turned off (S540). Then, the scanner preparation process ends.

Figure 12:
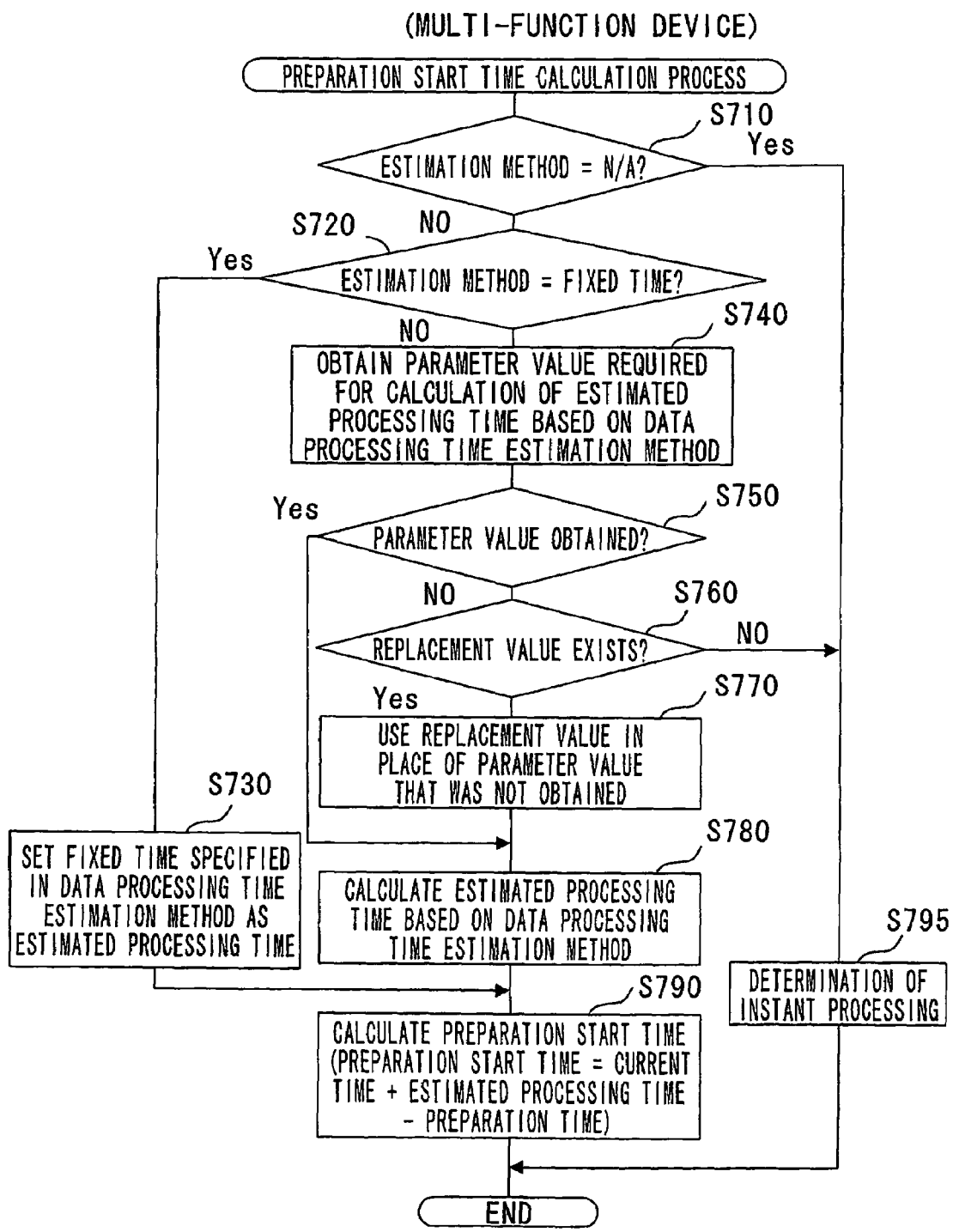
FIG. 12 is a flowchart showing a preparation start time calculation process performed by the controller of the multi-function device according to at least one illustrative aspect of the invention.

The laser beam printer preparation process performed by the controller 11 in S455 will be described with reference to FIG. 11. When the laser beam printer preparation process is started, the controller 11 turns on the laser beam printer preparation flag, which has been turned off and is stored in the RAM (S610). Then, flow proceeds to S620 where the controller 11 sets a preparation time of the laser beam printer 23 specified in the device table as an argument, and executes a preparation start time calculation process, as shown in the flowchart of FIG. 12.

As the preparation start time calculation process is started, the controller 11 determines whether data processing time estimation method, which is specified in the service list, of the service selected by a user on the service selection screen is "N/A (not applicable)". When it is determined that the data processing time estimation method is "N/A" (S710: YES), determination of instant processing is made in S795 for immediately entering the preparation period (preparation period of the scanner 21, the laser beam printer 23, and the inkjet printer 25 are shown in FIGS. 2C, 3C, and 4C, respectively). Then, the preparation start time calculation process ends.

When it is determined that the data processing time estimation method is not "N/A" (S710: NO), the controller 11 determines whether the data processing time estimation method represents a fixed time (S720). When it is determined that the data processing time estimation method represents a fixed time (S720: YES), flow proceeds to S730 where the fixed time specified in the data processing time estimation method is set as an estimated value of the data processing time (hereinafter referred to as the "estimated processing time"). Then flow proceeds to S790.

When it is determined that the data processing time estimation method represents an arithmetic expression (S720: YES), the controller 11 obtains, based on the arithmetic expression specified in the data processing time estimation method, a parameter value (a component of the arithmetic expression) required for the calculation of the estimated processing time (S740). For example, when the service selected by a user is "English-Japanese translation", the controller 11 obtains the value of the output page information stored in the output page storage area of the RAM, as the parameter value.

Thereafter, flow proceeds to S750 where the controller 11 determines whether the parameter value is successfully obtained. When it is determined that the parameter value is successfully obtained (S750: YES), flow proceeds to S780. When it is determined that the parameter value is not successfully obtained (S750: NO), flow proceeds to S760 where the controller 11 determines whether a replacement value exists that can be used in place of the parameter value that was not obtained. When it is determined that a replacement value exists (S760: YES), the replacement value is set as the parameter value (S770). Then, flow proceeds to S780. When it is determined that the replacement value does not exist (S760: NO), flow proceeds to S795 where a determination of instant processing is made.

For example, when the service selected by a user is "English-Japanese translation", the controller 11 determines that the replacement value exits (S760: YES), the number of input pages temporarily stored in the RAM in S300 is set as the parameter value for use in the arithmetic expression, in place of the value of the output page information (S770). Then, flow proceeds to S780.

In S780, the controller 11 calculates the estimated processing time, based on the arithmetic expression specified in the data processing time estimation method corresponding to the service selected by a user. Then, flow proceeds to S790. For example, when the service selected by a user is "English-Japanese translation", the controller 11 multiplies the value of the output page information (or the number of input pages) obtained from the function server 50 by 30 (seconds) and sets the obtained value (seconds) as the estimated processing time. Then, flow proceeds to S790.

In S790, the controller 11 calculates a preparation start time using the estimated processing time set in S730 or calculated in S780. The preparation start time is calculated based on the following expression to place a device in the standby state immediately before the device is driven. The preparation time set as the argument in S620 (and S820) at the start of the preparation start time calculation process is used in the following expression to obtain the preparation start time.

Preparation start time=current time+estimated processing time−preparation time

As the preparation start time is calculated in S790, the preparation start time calculation process ends.

As the preparation start time calculation process ends in S620, flow proceeds to S630 where the controller 11 determines whether the determination of the instant processing is made in S795 of the preparation start time calculation process (S630). When it is determined that the determination of the instant processing is made (S630: YES), flow proceeds to S650. When it is determined that the determination of the instant processing is not made (S630: NO), flow proceeds to S640 where the controller 11 waits until the preparation start time calculated in S620 has come. When the preparation start time has come, flow proceeds to S650.

In S650, the controller 11 turns the fixer 23c of the laser beam printer 23 on to make a heater of the fixer 23c heated. The controller 11 waits for a preparation time of the laser beam printer 23 specified in the device table to pass since the fixer 23c was turned on (S660). As the preparation time of the laser beam printer 23 has passed, the laser beam printer preparation flag, which has been turned on and is stored in the RAM, is turned off (S670). Then, the laser beam printer preparation process ends.

The inkjet printer preparation process performed by the controller in S465 will be described with reference to FIG. 13. When the inkjet printer preparation process is started, the controller 11 turns on the inkjet printer preparation flag, which has been turned off and is stored in the RAM (S810). Then, the controller 11 sets a preparation time of the inkjet printer 25 specified in the device table as an argument and executes the preparation start time calculation process, as shown in the flowchart of FIG. 12 (S820). As the preparation start time calculation process in S820 ends, the controller 11 determines in S830 whether determination of the instant processing is made in S795 of the preparation start time calculation process in S820. When it is determined that determination of the instant processing is made in S795 (S830: YES), flow proceeds to S850. When it is determined that the determination of instant processing is not made in S795 (S830: NO), flow proceeds to S840 where the controller 11 waits until the preparation start time calculated in S820 has come. When the preparation start time has come, flow proceeds to S850.

In S850, the controller 11 makes the inkjet printer 25 start cleaning the nozzles 25b and waits until the cleaning is finished (S860). As the cleaning is finished (S860: YES), the inkjet printer preparation flag, which has been turned on and is stored in the RAM, is turned off (S870). Then, the inkjet printer preparation process ends.

Figure 14:
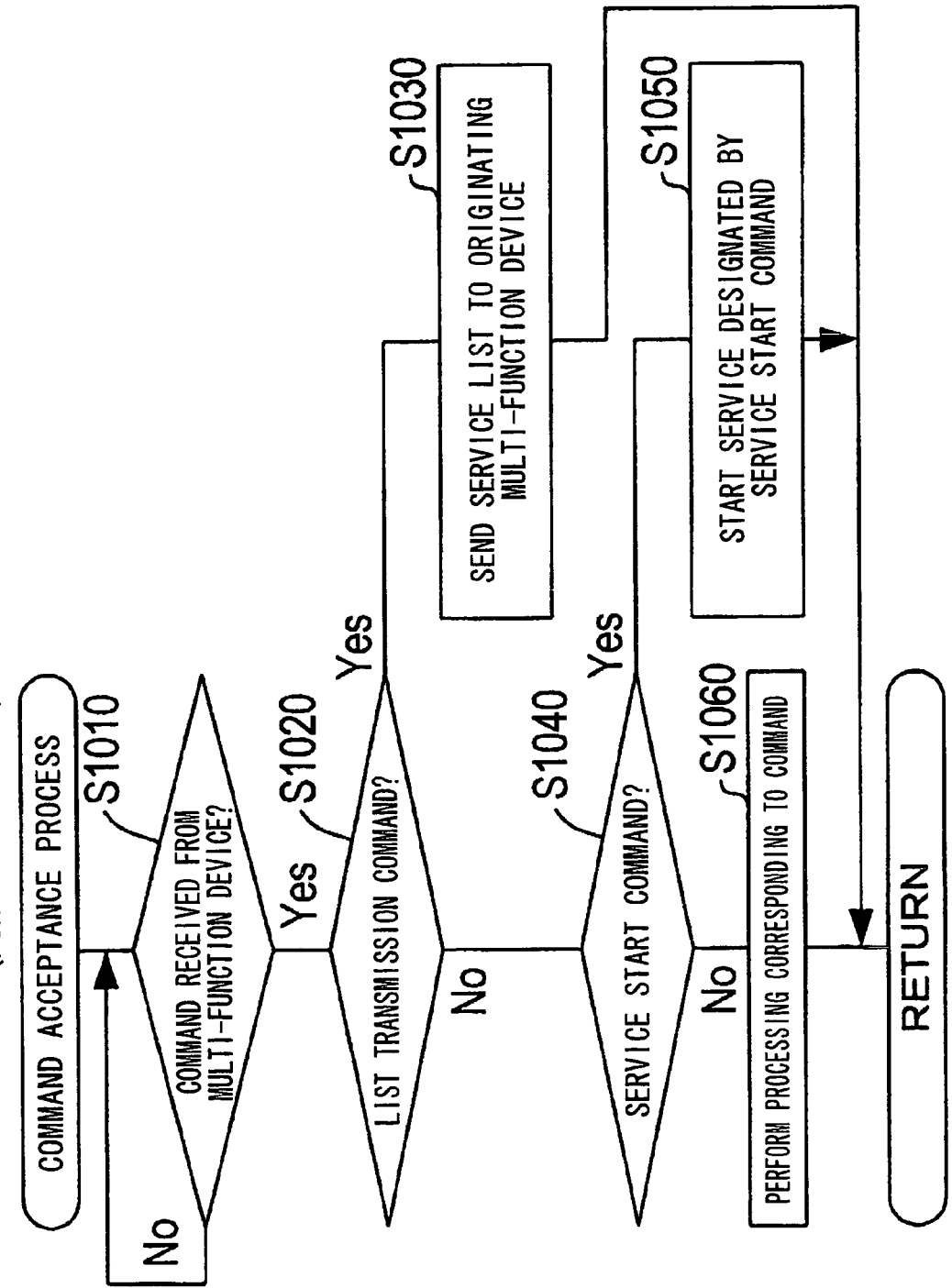
FIG. 14 is a flowchart showing a command acceptance process performed by a controller of the server according to at least one illustrative aspect of the invention.

Processing performed by the controller 51 of the function server 50 will be described below. FIG. 14 is a flowchart showing a command acceptance process repeatedly performed by the controller 51 of the function server 50.

As the command acceptance process is started, the controller 51 waits until a command is received from the multi-function device 10 via the network 3 (S1010). When a command is received from the multi-function device 10 (S1010: YES), the controller 51 determines whether the command is the list transmission command (S1020). When it is determined that the received command is the list transmission command (S1020: YES), flow proceeds to S1030 where the service list is read out from the storage portion 53 and transmitted to the originating multi-function device 10, which has transmitted the list transmission command. Then, the command acceptance process ends.

When it is determined that the received command is not the list transmission command (S1020: NO), flow proceeds to S1040 where the controller 51 determines whether the received command is the service start command. When it is determined that the received command is the service start command (S1040: YES), the controller 51 sets the originating multi-function device 10, which has transmitted the service start command, to a device to which the service is provided, and a program corresponding to the service designated in the service start command is executed (S1050).

Figure 15:
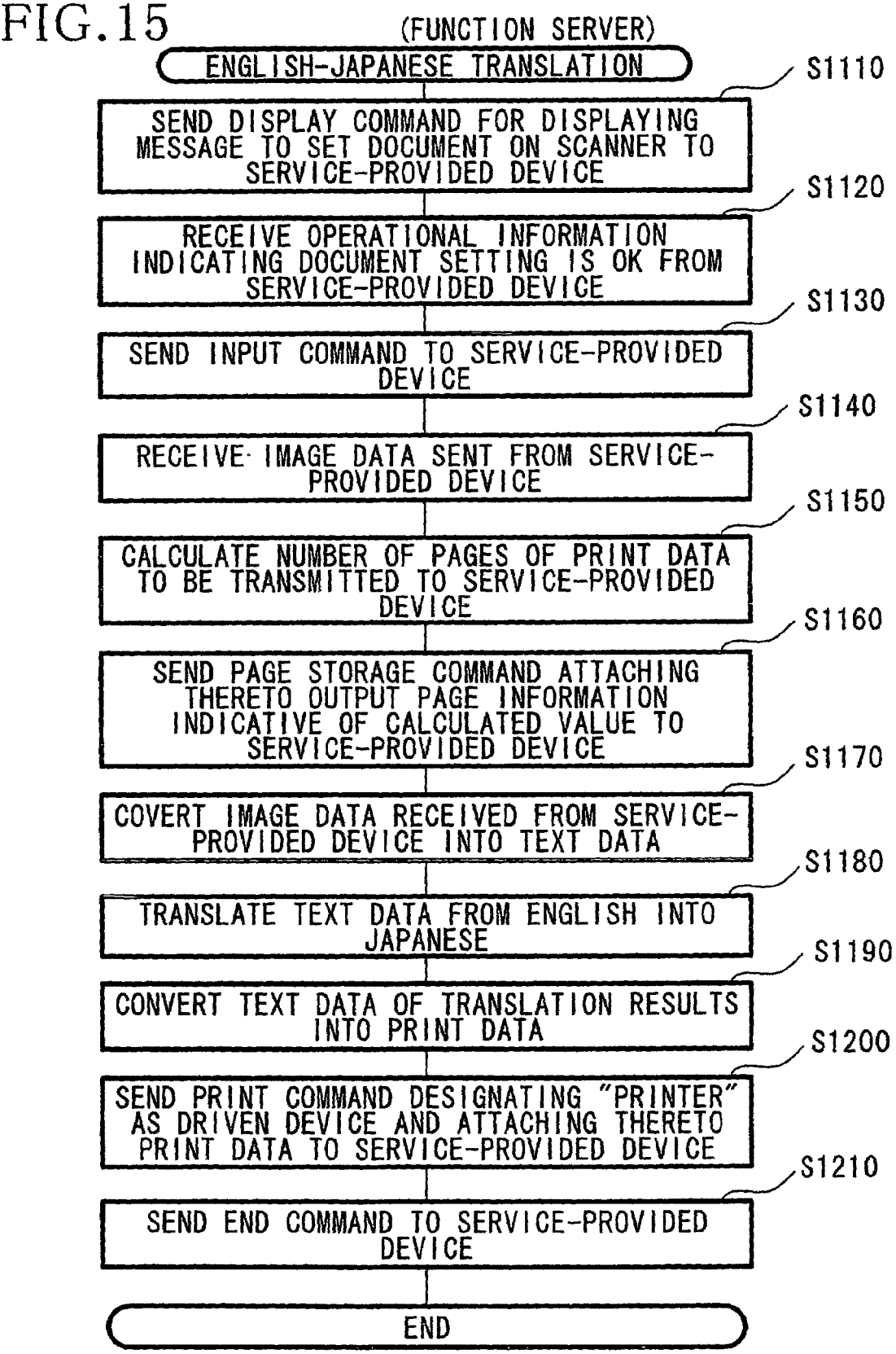
FIG. 15 is a flowchart showing an English-Japanese translation process performed by the controller of the server according to at least one illustrative aspect of the invention.
Figure 16:
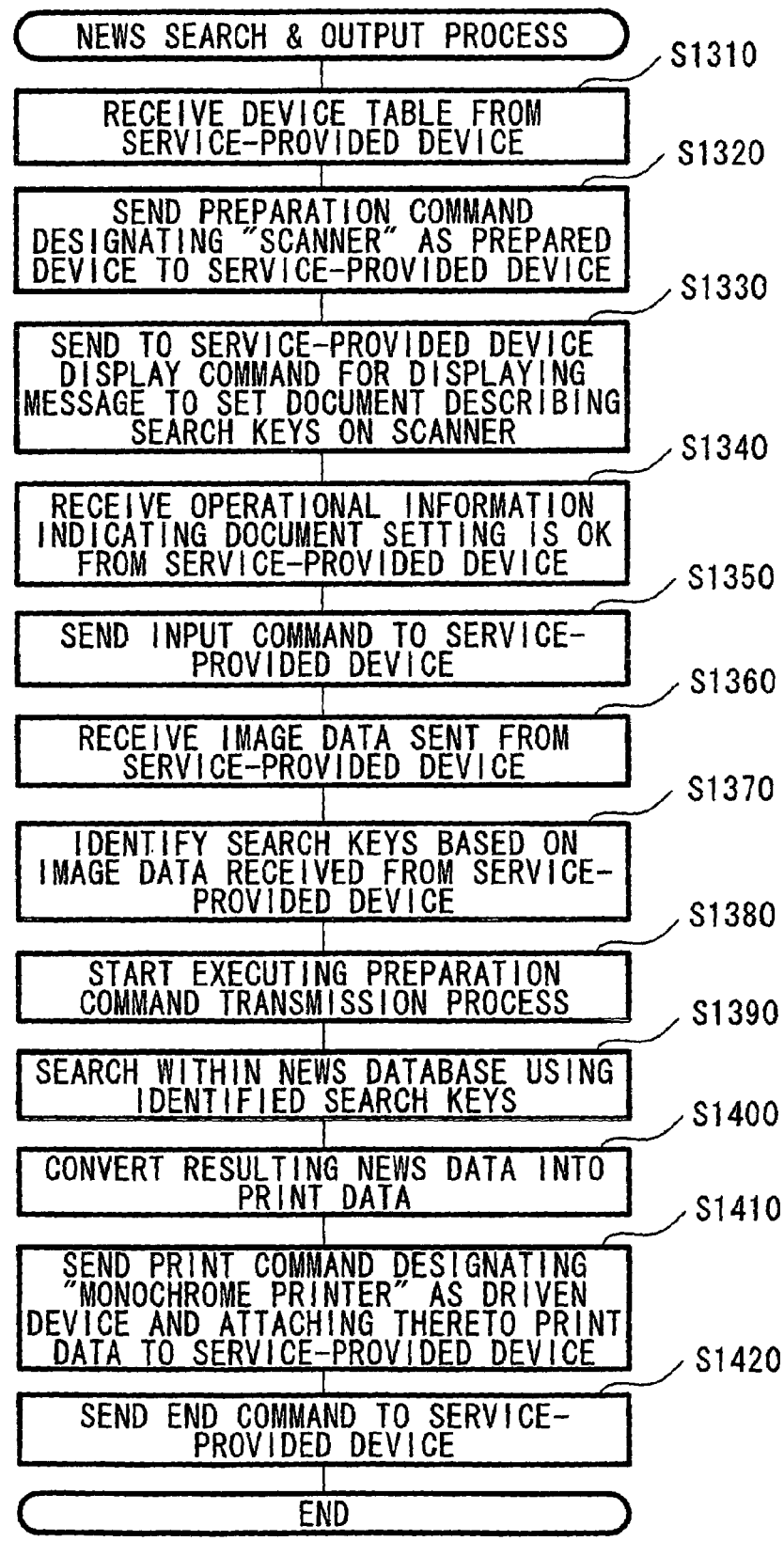
FIG. 16 is a flowchart showing a news search & output process performed by the controller of the server device according to at least one illustrative aspect of the invention.

More specifically, when the service start command instructs the execution of a program corresponding to "English-Japanese translation" service, a program for "English-Japanese translation" service is started, to perform an English-Japanese translation process, as shown in FIG. 15. When the service start command instructs the execution of a program corresponding to "news search & output" service, a program for "news search & output" service is started, to perform a news search & output process, as shown in FIG. 16. As the process in S1050 is finished, the controller 51 finishes the command acceptance process.

When it is determined that the received command is not the service start command (S1040: NO), the controller 51 performs processing corresponding to the received command, of which detailed description is omitted. Then, the command acceptance process ends.

Next, the English-Japanese translation process performed by the controller 51 will be described in detail below with reference to FIG. 15.

When the English-Japanese translation process is started, the controller 51 sends, via the network 3, a display command for displaying a message to set a document on the scanner 21, to the multi-function device 10 to which the service is provided (hereinafter referred to as the "service-provided device 10") (S1110). The controller 51 waits until it receives operational information, which indicates the document setting is OK and is transmitted in S250 (FIG. 7) from the service-provided device 10 (S1120). When the operation information indicating the document setting is OK is received, flow proceeds to S1130 where the input command is transmitted to the service-provided device 10.

Then, in S1140, the controller 51 waits until it receives the image data transmitted in S290 (FIG. 7) from the service-provided device 10. When the image data is received, the controller 51 calculates the number of pages of print data, to be transmitted to the service-provided device 10, after the receive image data is subjected to S1170-1190 (S1150). Then, the controller 51 transmits to the service-provided device 10, the page storage command attaching thereto the output page information indicative of the number of pages of print data calculated in S1150 (S1160).

Thereafter, flow proceeds to S1170 where the controller 51 converts the image data received from the service-provided device 10 into text data and the text data is translated from English into Japanese (S1180). When the translation is complete, flow proceeds to S1190 where the text data of the translation results is converted into print data.

Thereafter, the controller 51 transmits to the service-provided device 10 the print command designating the "printer" as the driven device and attaching thereto the print data generated in S1190 (S1200). Then, the controller 51 transmits the end command to the service-provided device 10 (S1210) and the English-Japanese translation process ends.

The news search & output process will be described with reference to FIG. 16. When the news search & output process is started, the controller 51 waits until it receives the device table transmitted from the service-provided device 10 in S180 (S1310). When the device table is received, flow proceeds to S1320 where the controller 51 transmits the preparation command designating the "scanner" as a prepared device, to the service-provided device 10.

Then, flow proceeds to S1330 where the controller 51 sends to the service-provided device 10 the display command for displaying a message to set a document describing a search key(s) on the scanner 21.

Then, the controller 51 waits until operational information, which indicates the document setting is OK and is transmitted from the service-provided device 10 in S250 (FIG. 7), is received (S1340). When the operation information indicating the document setting is OK is received, flow proceeds to S1350 where the input command is transmitted to the service-provided device 10.

Thereafter, in S1360, the controller 51 waits until the controller 51 receives the image data transmitted from the service-provided device 10 in S290 (FIG. 7). When the image data is received, the controller 51 identifies the search key(s) desired by a user, based on the image data (S1370). The controller 51 starts executing a preparation command transmission process for the "news search & output" service, as shown in FIG. 17 (S1380).

After the preparation command transmission process is started, the controller 51 searches news data including the identified search key(s) within a news database (S1390), concurrently with the preparation command transmission process. As the search is finished, resulting news data including the identified search key(s) is converted into print data adapted for the service-provided device 10 (S1400). Then, flow proceeds to S1410.

In S1410, the controller 51 transmits to the service-provided device 10 the print command designating the "monochrome printer" as the driven device and attaches thereto the print data generated in S1400. Then, the end command is transmitted to the service-provided device 10 (S1420) and the news search & output process ends.

Figure 17:
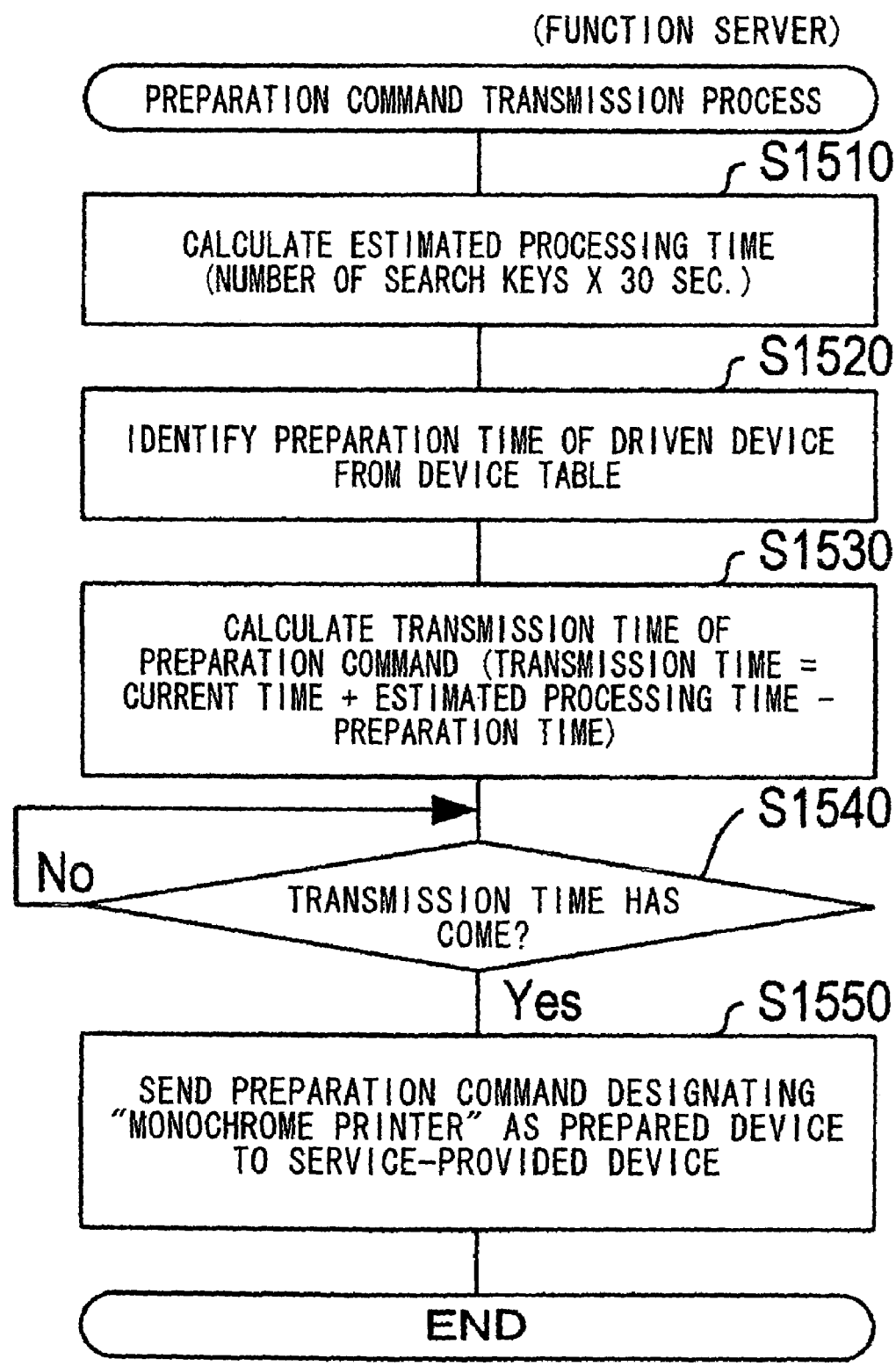
FIG. 17 is a flowchart showing a preparation transmission process performed by the controller of the server device according to at least one illustrative aspect of the invention.

FIG. 17 is a flowchart that the controller 51 starts to execute in S1380. As the controller 51 starts, in S1380, the preparation command transmission process shown in FIG. 17, the estimated processing time is calculated using the following expression based on the number of the search keys identified in S1370 (S1510).

Estimated processing time=the number of search keys×30 seconds

As the calculation of the estimated processing time in S1510 is finished, flow proceeds to S1520 where the preparation time of the driven device designated when the print command is transmitted is identified by the preparation time specified in the device table. More specifically, the print command designating the "monochrome printer" as the driven device is transmitted in the "news search & output" service. Accordingly, the value of the preparation time of the laser beam printer 23 having the device tag information of the "monochrome printer" is identified as the preparation time of the driven device.

As the identification of the preparation time of the driven device in S1520 is finished, flow proceeds to S1530 where the controller 51 calculates the transmission time of the preparation command designating the "monochrome printer" as the prepared device, using the following expression.

Transmission time=current time+estimated processing time−preparation time

As thus the transmission time of the preparation command is calculated in S1530, the controller 51 waits until the transmission time has come (S1540). When the transmission time has come (S1540: YES), the preparation command designating the "monochrome printer" as the prepared device is transmitted to the service-provided device 10 (S1550). Then, the preparation command transmission process ends.

In the service providing system 1, the multi-function device 10 includes a plurality of the I/O devices, such as the scanner 21, the laser beam printer 23, and the inkjet printer 25. The I/O devices are driven based on drive instructions, such as the input command and the print command from the function server 50, according to the service providing process, as shown in FIG. 7. The multi-function device 10 provides various services in cooperation with the function server 50.

More specifically, the function server 50 inputs to the multi-function device 10 the drive instructions for the I/O devices that need to be driven, according to the services to be provided. As a user selects a service and inputs information of the selected service to the multi-function device 10, via the control panel 15, the multi-function device 10 inputs the service start command to the function server 50 to make the function server 50 start the relevant service. Based on the drive instruction from the function server 50, the I/O device required to be driven to provide the service selected by the user is only selectively driven.

Before the multi-function device 10 receives the print command or the input command from the function server 50, the multi-function device 10 performs the device preparation process in S190 and S220 in FIG. 7. Thus, the I/O devices placed in the non-standby state or sleep condition, in which the I/O devices are not ready for printing or image reading operations, are put into the standby state in which the I/O devices are ready for the printing or image reading operations.

To place the I/O devices into the standby state, the multi-function device 10 obtains from the function server 50 the device use information representing a type of a device to which a drive instruction is provided when a service is provided (S120). When the multi-function device 10 itself has authority to determine the execution of the preparation process of the I/O devices (scanner preparation process, laser beam printer preparation process, inkjet printer preparation process) (i.e. when the preparation determination authority in the service list is the "multi-function device"), the preparation process corresponding to the I/O devices registered in the device use information of the service selected by the user is only selectively executed. Thus, the I/O devices required to be driven to provide the service selected by the user are only selectively put into the standby state before the I/O devices are driven.

Accordingly, power or ink may not be wasted by placing the I/O devices, which need not to be driven, in the standby state. When various services are provided, power or ink may be effectively used.

Further, the driving time or the time of receiving the drive instruction (print command), which is transmitted from the function server 50, for driving relevant I/O device is estimated in S730 and S780. To place an I/O device selected as a driven device in the standby state immediately before the receiving time of the drive instruction (current time+estimated processing time), the preparation start time for the driven I/O device is calculated based on the expression, "current time+estimated processing time−preparation time". The preparation start time is determined as an execution time of processing required to place the driven I/O device in the standby state (S790).

More specifically, for example, when the driven device is the laser beam printer 23, the time when the fixer 23c is turned on (i.e. execution time of S650) is determined by the above-identified expression. When the driven device is the inkjet printer 25, the time when the cleaning is started (i.e. execution time of S850) is determined. When the driven device is the scanner 21, the time of receiving the drive instruction (input command) for the scanner 21 is exceptionally determined as "instant". Accordingly, the time when the lamp 21b of the scanner 21 is turned on, (i.e. execution time of S520) is determined as "instantly after the execution of the scanner preparation process", and the lamp 21b of the scanner 21 is turned on instantly after the execution of the scanner preparation process (S520).

In the service providing system 1, the time to execute the process required to place the relevant I/O device in the standby state is determined such that the operated I/O device is placed in the standby state immediately before the driving time thereof. Because the operated I/O device cannot be placed in the standby state at the start of the provision of the service, even when the time until the I/O devices is operated is long after the start of the provision of the service, power or ink may be prevented from being wasted.

Further, in the service providing system 1, the preparation times required to place the I/O devices into the standby state from the non-standby or sleep condition are registered in the device table according to the I/O devices. Based on the preparation time specified in the device table and the estimated processing time, the time (preparation start time) to execute the process required to place the laser beam printer 23 or the inkjet printer 25 in the standby state, is determined. With the adjustment of the preparation time registered in the device table, the laser beam printer 23 or the inkjet printer 25 can be appropriately placed in the standby state just before the printer 23, 25 is driven.

In addition, in the service providing system 1, the multi-function device 10 obtains from the function server 50 the service list having the device use information, according to the available services, representing the I/O devices required to be driven for the provision of the services. In the device preparation process executed in S190, the driven I/O devices are identified based on the device use information of the service list. Only the relevant I/O devices are selectively placed in the standby state. Therefore, when services available from the service providing system 1 are changed, operations of the multi-function device 10 may be adapted with changes of the service list, without changing the programs for the device preparation process.

A service providing system according to aspects of the invention may be realized by the service providing process (in FIGS. 7 and 8) executed by the controller 11 of the multi-function device 10. A preparation device may be realized by the device preparation process (and the scanner preparation process, the laser beam printer preparation process, and the inkjet printer preparation process that are executed during the device preparation process). An estimation device may be realized by a process (S730/S780) of calculating the estimated processing time. A determination device may be realized by a process (S790) of calculating the preparation start time. A required time storage device may correspond to the storage portion 17 storing the device table. A drive device information storage device may correspond to the storage portion 53 storing the service list.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example structures of the disclosure, as set forth above, are intended to be illustrative of the invention, and not limiting the invention. Various changes may be made without departing from the spirit and scope of the invention. Therefore, the disclosure is intended to embrace all known or later developed alternatives, modifications, variations, improvements, and/or substantial equivalents. Some specific examples of potential alternatives, modifications, or variations in the described invention are provided below:

In the above-described example structures, the service providing system 1 includes the multi-function device 10 provided with the I/O devices (scanner 21, laser beam printer 23, and inkjet printer 25) and the function server 50 that inputs a drive instruction for driving an I/O device to the multi-function device 10. However, the invention may be applied to such a service providing system in which a plurality of I/O devices are individually connected to the network 3 and a server device performs centralized control of the I/O devices to provide various services.

The I/O devices are not limited to the scanner 21, the laser beam printer 23, and the inkjet printer 25. However, other I/O devices may be used that call for driving preparation when a service is provided.

In the above illustrative aspects, the start time of cleaning the nozzles 25b is calculated, based on the estimated processing time and the preparation time. In an inkjet printer using general ink, drying speed of ink is adequately slow, so that the execution time of the cleaning does not have to be precisely determined, as described above, by calculating the start time of the cleaning. More specifically, the multi-function device 10 may unconditionally determine as "YES" in S830 in the inkjet printer preparation process, as shown in FIG. 13, to start cleaning.

In the above illustrative aspects, the multi-function device 10 is configured such that the lamp 21b of the scanner 21 is turned on immediately after the scanner preparation process is started. However, other configurations may be employed such that the lamp 21b is turned on at a preparation start time obtained by performing the preparation start time calculation process, similarly as the preparation start time calculation process is performed in the laser beam printer preparation process or the inkjet printer preparation process.

What is claimed is:

1. A service providing system, comprising:
a plurality of input/output devices configured to perform input and output operations;
a service providing device configured to provide services by driving the plurality of input/output devices;
a preparation device, in response to receipt of provision command for a service, configured to selectively place the input/output devices, for providing the service, which are in a non-standby state into a standby state;
an estimation device configured to estimate a driving time for the service providing device to drive the input/output devices; and
a determination device configured to determine an execution time for the preparation device to selectively place the input/output devices into the standby state, based on the driving time,
wherein the preparation device selectively places the input/output devices into the standby state, based on the execution time.

2. The service providing system according to claim 1, wherein the determination device determines the execution time of the preparation device for the input/output devices to be selectively placed in the standby state immediately prior to the driving time.

3. The service providing system according to claim 1, further comprising a time storage device configured to store a time when the preparation device starts selectively placing the input/output devices into the standby state, wherein the determination device determines the execution time, based on the driving time and the time stored in the time storage device.

4. The service providing system according to claim 1, further comprising:
a drive device information storage device configured to store, according to the services available from the service providing device, information identifying the input/output devices that are driven to provide the services, wherein the preparation device selectively places the input/output devices to be driven into the standby state, based on the information stored in the drive device information storage device and the execution time.

5. The service providing system according to claim 1, wherein one of the plurality of the input/output devices is a printer including a fixer, the printer forming a toner image on a recording medium and thermally fixing the toner image on the recording medium using the fixer, and
when the printer is in the non-standby state with the fixer turned off, the preparation device places the printer in the standby state by turning the fixer on.

6. The service providing system according to claim 1, wherein one of the plurality of the input/output devices is a scanner including a lamp, the scanner irradiating a read object with the lamp to read information on the read object based on reflected light, and
when the scanner is in the non-standby state with the lamp turned off, the preparation device places the scanner into the standby state by turning the lamp on.

7. A service providing system, comprising:
a plurality of input/output devices configured to perform input and output operations;
a service providing device configured to provide services by driving the plurality of input/output devices;
a preparation device, in response to receipt of a provision command for a service, configured to selectively place the input/output devices, for providing the service, which are in a non-standby state into a standby state; and
an estimation device configured to estimate a driving time for the service providing device to drive the input/output devices.
wherein the preparation device selectively places the input/output devices into the standby state, based on the driving time,
wherein one of the plurality of the input/output devices is an inkjet printer configured to eject ink from nozzles to form an image on a recording medium, and
when the inkjet printer is in the non-standby state where the nozzles are not cleaned, the preparation device places the inkjet printer into the standby state by cleaning the nozzles.

8. The service providing system according to claim 1, further comprising:
a digital multi-function device, connected to a network, includes an operation device configured to be operated by a user, the plurality of the input/output devices, the service providing device, and the preparation device; and a control device configured to communicate with the digital multi-function device via the network, the control device controlling the services, wherein when the provision command for the service is received through the operation device, the service providing device establishes communication with the control device and drives the input/output devices to be driven to provide the service in response to a drive command from the control device.

9. In a multi-function device system including a plurality of input/output devices, a method of providing a service comprising:

receiving a provision command for a service;

estimating a driving time to drive the input/output devices;

selectively placing the input/output devices for providing the service into a standby state in response to the provision command based on the driving time; and determining an execution time to selectively place the input/output devices into the standby state based on the driving time; and selectively placing the input/output devices into the standby state based on the execution time.

10. The method of claim 9, further comprising determining the execution time for the input/output devices to be selectively placed in the standby state immediately prior to the driving time.

11. The method of claim 9, further comprising retrieving a stored time indicating when to start selectively placing the input/output devices into the standby state; and determining the execution time of the processing, based on the driving time and the time stored.

12. The method of claim 9, further comprising:

retrieving information identifying the input/output devices used to provide the service; and selectively placing the input/output devices used to provide the service into the standby state, based on the identifying the execution time.

* * * * *

UNITED STATES PATENT AND TRADEMARK OFFICE
CERTIFICATE OF CORRECTION

| | |
|---|---|
| PATENT NO. | : 7,395,121 B2 |
| APPLICATION NO. | : 11/341455 |
| DATED | : July 1, 2008 |
| INVENTOR(S) | : Kazuma Aoki |

It is certified that error appears in the above-identified patent and that said Letters Patent is hereby corrected as shown below:

In the Claims section, Column 20, Claim 7, line 52-53:
    Please replace "drive the input/output devices." with --drive the input/output devices,--.

Signed and Sealed this

Second Day of June, 2009

JOHN DOLL
*Acting Director of the United States Patent and Trademark Office*